US009830269B2

(12) United States Patent
McKean et al.

(10) Patent No.: US 9,830,269 B2
(45) Date of Patent: Nov. 28, 2017

(54) METHODS AND SYSTEMS FOR USING PREDICTIVE CACHE STATISTICS IN A STORAGE SYSTEM

(71) Applicant: NETAPP, INC., Sunnyvale, CA (US)

(72) Inventors: Brian D. McKean, Longmont, CO (US); Donald R. Humlicek, Wichita, KS (US)

(73) Assignee: NetApp Inc., Sunnyvale, CA (US)

( * ) Notice: Subject to any disclaimer, the term of this patent is extended or adjusted under 35 U.S.C. 154(b) by 185 days.

(21) Appl. No.: 14/445,354

(22) Filed: Jul. 29, 2014

(65) Prior Publication Data

US 2016/0034394 A1 Feb. 4, 2016

(51) Int. Cl.
- *G06F 12/08* (2016.01)
- *G06F 12/0866* (2016.01)
- *G06F 12/0806* (2016.01)
- *H04L 29/08* (2006.01)
- *G06F 12/0891* (2016.01)

(52) U.S. Cl.
CPC ...... *G06F 12/0866* (2013.01); *G06F 12/0806* (2013.01); *G06F 12/0891* (2013.01); *H04L 67/1097* (2013.01); *H04L 67/2842* (2013.01); *G06F 2212/1021* (2013.01); *G06F 2212/1036* (2013.01); *G06F 2212/1044* (2013.01); *G06F 2212/314* (2013.01)

(58) Field of Classification Search
CPC ........... G06F 12/0866; G06F 2212/601; G06F 12/0871; G06F 2212/222; G06F 12/122; G06F 12/123; G06F 2212/466
See application file for complete search history.

(56) References Cited

U.S. PATENT DOCUMENTS

| | | | | |
|---|---|---|---|---|
| 6,952,664 B1* | 10/2005 | Lahiri | ................. | G06F 17/5022 703/13 |
| 7,434,002 B1* | 10/2008 | Zedlewski | .......... | G06F 11/3409 711/130 |
| 2005/0138165 A1* | 6/2005 | Tang | ................. | H04N 21/2181 709/224 |
| 2014/0095775 A1* | 4/2014 | Talagala | .............. | G06F 12/0866 711/103 |
| 2014/0115261 A1* | 4/2014 | Maybee | .............. | G06F 12/0897 711/136 |

OTHER PUBLICATIONS

Soundararajan et al., Extending SSD Lifetimes with Disk-Based Write Caches, Feb. 26, 2010, USENIX Association, pp. 102-112.*

* cited by examiner

*Primary Examiner* — Reginald Bragdon
*Assistant Examiner* — Thanh Vo
(74) *Attorney, Agent, or Firm* — Haynes and Boone, LLP

(57) ABSTRACT

Method and systems for a storage system are provided. Simulated cache blocks of a cache system are tracked using cache metadata while performing a workload having a plurality of storage operations. The cache metadata is segmented, each segment corresponding to a cache size. Predictive statistics are determined for each cache size using a corresponding segment of the cache metadata. The predictive statistics are used to determine an amount of data that is written for each cache size within certain duration. The process then determines if each cache size provides an endurance level after executing a certain number of write operations, where the endurance level indicates a desired life-cycle for each cache size.

20 Claims, 16 Drawing Sheets

1318

| Cache Size 1320 | Does working size fit? 1322 |
|---|---|
| 1 | No |
| 2 | No |
| 3 | No |
| 4 | Yes |
| 5 | Yes |
| 6 | Yes |
| 7 | Yes |
| 8 | Yes |
| 9 | Yes |
| 10 | Yes |

1300

| Device 1302 | Drive Writes per day 1304 | Years of Life 1306 |
|---|---|---|
| A | 10 | 5 |
| B | 3 | 3 |
| C | 1 | 3 |

1308

| Cache Size 1310 | GBs written during sample period (60minutes) 1312 | GB Written in a Day 1314 | Minimum Size 1316 |||
|---|---|---|---|---|---|
| | | | Device A | Device B | Device C |
| 1 | Does not fit | -- | -- | -- | -- |
| 2 | Does not fit | -- | -- | -- | -- |
| 3 | Does not fit | -- | -- | -- | -- |
| 4 | 90 | 2160 | 216 | 720 | 2160 |
| 5 | 85 | 2040 | 204 | 680 | 2040 |
| 6 | 80 | 1920 | 192 | 640 | 1920 |
| 7 | 75 | 1800 | 180 | 600 | 1800 |
| 8 | 70 | 1680 | 168 | 560 | 1680 |
| 9 | 70 | 1680 | 168 | 560 | 1680 |
| 10 | 70 | 1680 | 168 | 560 | 1680 |

FIG. 13

METHODS AND SYSTEMS FOR USING PREDICTIVE CACHE STATISTICS IN A STORAGE SYSTEM

TECHNICAL FIELD

The present disclosure pertains to data storage systems, and more particularly to using predictive cache statistics.

BACKGROUND

A network storage controller is a processing system that is used to store and retrieve data on behalf of one or more hosts on a network. A storage controller operates on behalf of one or more hosts to store and manage data in a set of mass storage devices, e.g., magnetic or optical storage-based disks, solid state devices, or tapes. Some storage controllers are designed to service file-level requests from hosts, as is commonly the case with file servers used in network attached storage (NAS) environments. Other storage controllers are designed to service block-level requests from hosts, as with storage controllers used in a storage area network (SAN) environment. Still other storage controllers are capable of servicing both file-level requests and block-level requests.

With the advent of solid state cache systems, and flash-based cache systems in particular, the size of cache memory that is utilized by a storage controller has grown relatively large, in many cases, into Terabytes. Furthermore, conventional storage systems are often configurable providing for a variety of cache memory sizes. Typically, the larger the cache size, the better the performance of the storage system. However, cache memory is expensive and performance benefits of additional cache memory can decrease considerably as the size of the cache memory increases, e.g., depending on the workload.

Currently, some storage systems offer the ability to simulate a specified cache size and gather limited predictive statistics for a particular simulated cache size. Unfortunately, the simulations can be extremely time consuming and must be run numerous times to determine predictive cache statistics for different cache sizes. Therefore, the problems of multiple configurations and excessive time consumption pose a significant challenge when determining an appropriate cache size for a storage system. Continuous efforts are being made for efficiently determining and using predictive cache statistics.

SUMMARY

In one aspect, a machine implemented method for a storage system is provided. The method includes tracking simulated cache blocks of a cache system using cache metadata while performing a workload having a plurality of storage operations, where the cache metadata is segmented, each segment corresponding to a cache size; determining predictive statistics for each cache size using a corresponding segment of the cache metadata; using the predictive statistics to determine an amount of data that is written for each cache size within a certain duration; and determining an endurance level that each cache size provides after executing a certain number of write operations, where the endurance level indicates a desired life-cycle for each cache size.

In another aspect, a non-transitory, machine readable storage medium having stored thereon instructions for performing a method is provided. The machine executable code which when executed by at least one machine, causes the machine to: track simulated cache blocks of a cache system using cache metadata while performing a workload having a plurality of storage operations, where the cache metadata is segmented, each segment corresponding to a cache size; determine predictive statistics for each cache size using a corresponding segment of the cache metadata; use the predictive statistics to determine an amount of data that is written for each cache size within a certain duration; and determine an endurance level that each cache size provides after executing a certain number of write operations, where the endurance level indicates a desired life-cycle for each cache size.

In yet another aspect, a system comprising of a memory containing machine readable medium comprising machine executable code having stored thereon instructions; and a processor module coupled to the memory are provided. The processor module is configured to execute the machine executable code to: track simulated cache blocks of a cache system using cache metadata while performing a workload having a plurality of storage operations, where the cache metadata is segmented, each segment corresponding to a cache size; determine predictive statistics for each cache size using a corresponding segment of the cache metadata; use the predictive statistics to determine an amount of data that is written for each cache size within a certain duration; and determine an endurance level that each cache size provides after executing a certain number of write operations, where the endurance level indicates a desired life-cycle for each cache size.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 13 shows an example of data structures used by the process of FIG. 12, according to one aspect of the present disclosure.

DETAILED DESCRIPTION

Figure 1:
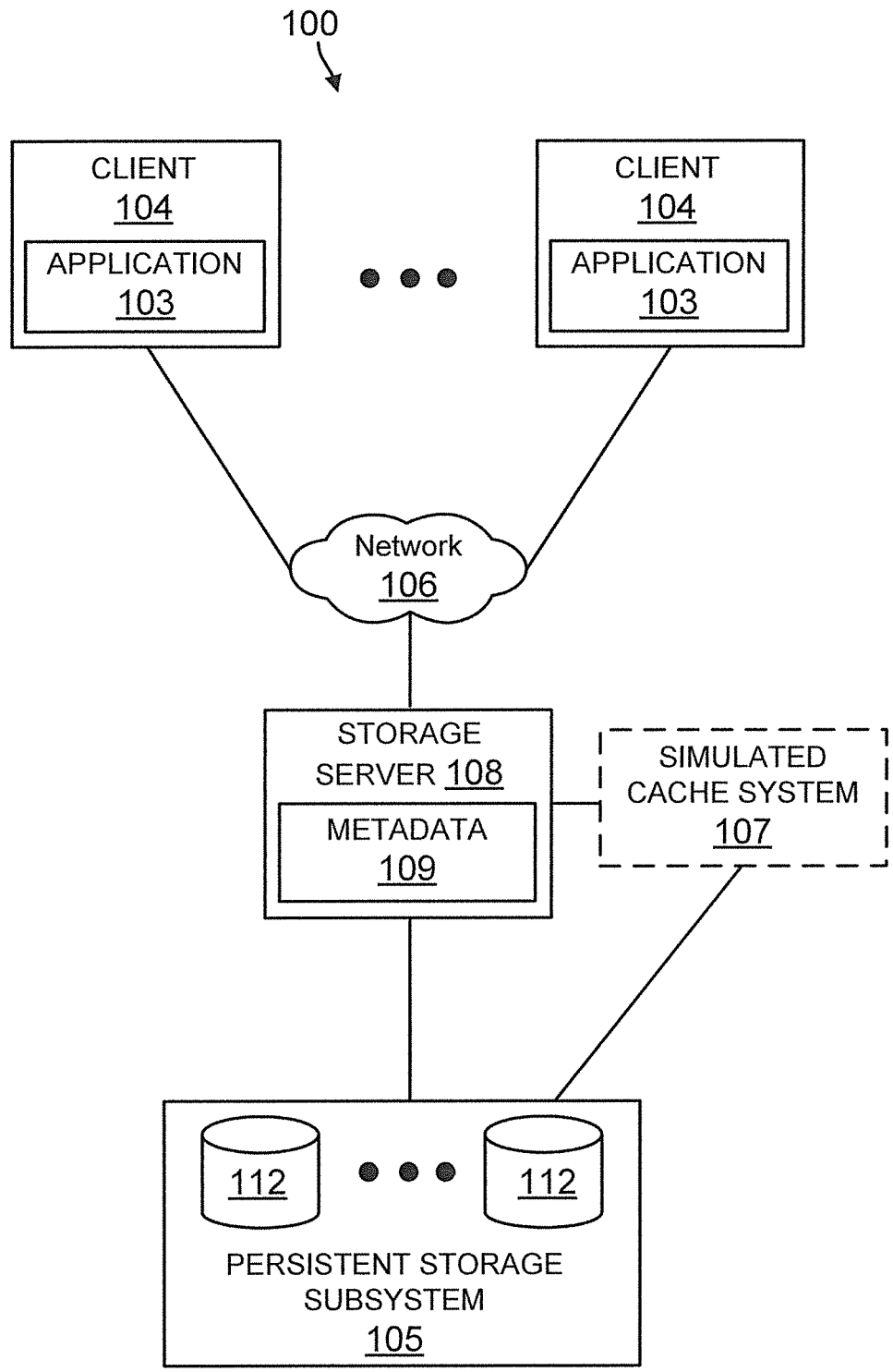
FIG. 1 is a block diagram illustrating an example of a network storage system, according to one aspect.

As a preliminary note, the terms "component", "module", "system," and the like as used in this disclosure are intended to refer to a computer-related entity, either programmable instructions-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, flash memory device or any other non-volatile memory device, or any other storage device, in accordance with the claimed subject matter.

As discussed above, many storage systems now implement solid state or flash-based cache systems. A storage system with a flash-based cache system provides numerous benefits over conventional storage systems (storage systems without flash-based cache systems). For example, a storage system with a flash-based cache system can: (1) simplify storage and data management through automatic staging/de-staging for target volumes; (2) improve storage cost efficiency by reducing the number of drives needed to meet performance requirements and thereby reduce overall power consumption and cooling requirements; and (3) improve the read performance of the storage system.

However, cache memory is expensive and performance benefits of additional cache memory can decrease considerably as the size of the cache memory increases depending on the workload. Additionally, the simulations can be extremely time consuming and must be run numerous times to determine predictive cache statistics for different cache sizes.

Cache tracking technology for generating predictive cache statistics for various cache sizes for a cache system is described. In various embodiments, the cache tracking mechanism ("the technology") can track simulated cache blocks of a cache system using segmented cache metadata while performing a workload including various read and write requests (client-initiated I/O operations) received from client systems (or clients). The segmented cache metadata corresponds to one or more of the various cache sizes for the cache system.

In some embodiments, the technology augments a least recently used (LRU) based cache tracking mechanism with segment tracking pointers and segment identifiers added to the metadata structures. The segments correspond to multiple cache sizes and the described tracking mechanism tracks the maximum cache size. In some embodiments, there need not be actual cached blocks used to run the predictive cache statistics. Rather, simulated cache blocks can be used to gather the statistics through the use of the cache block metadata.

Although the examples discussed herein are primarily directed to a LRU-based cache tracking mechanism, other cache tracking mechanisms can alternatively or additionally be utilized. For example, the technology described herein can be applied to a most recently used (MRU) algorithm, a clocked algorithm, various weighted algorithms, adaptive replacement cache (ARC) algorithms, etc.

System 100: FIG. 1 is a block diagram illustrating an example network storage system 100 (or configuration) in which the technology introduced herein can be implemented. The network configuration described with respect to FIG. 1 is for illustration of a type of configuration in which the technology described herein can be implemented. As would be recognized by one skilled in the art, other network storage configurations and/or schemes could be used for implementing the technology disclosed herein.

As illustrated in the example of FIG. 1, the network storage system 100 includes multiple client systems 104, a storage server 108, and a network 106 connecting the client systems 104 and the storage server 108. The storage server 108 is coupled with a number of mass storage devices (or storage containers) 112 in a mass storage subsystem 105. Some or all of the mass storage devices 112 can be various types of storage devices, e.g., disks, flash memory, solid-state drives (SSDs), tape storage, etc. However, for ease of description, the storage devices 112 are discussed as disks herein. However as would be recognized by one skilled in the art, other types of storage devices could be used.

Although illustrated as distributed systems, in some embodiments the storage server 108 and the mass storage subsystem 105 can be physically contained and/or otherwise located in the same enclosure. For example, the storage system 108 and the mass storage subsystem 105 can together be one of the E-series storage system products available from NetApp®, Inc., the assignee of the present application. The E-series storage system products can include one or more embedded controllers (or storage servers) and disks. Furthermore, the storage system can, in some embodiments, include a redundant pair of controllers that can be located within the same physical enclosure with the disks. The storage system can be connected to other storage systems and/or to disks within or outside of the enclosure via a serial attached SCSI (SAS)/Fibre Channel (FC) protocol. Other protocols for communication are also possible including combinations and/or variations thereof.

In another embodiment, the storage server 108 can be, for example, one of the FAS-series of storage server products available from NetApp®, Inc. The client systems 104 can be connected to the storage server 108 via the network 106, which can be a packet-switched network, for example, a local area network (LAN) or wide area network (WAN). Further, the storage server 108 can be connected to the storage devices 112 via a switching fabric (not illustrated), which can be a fiber distributed data interface (FDDI) network, for example. It is noted that, within the network data storage environment, any other suitable number of storage servers and/or mass storage devices, and/or any other suitable network technologies, may be employed.

The storage server 108 can make some or all of the storage space on the storage devices 112 available to the client systems 104 in a conventional manner. For example, each of the storage devices 112 can be implemented as an individual disk, multiple disks (e.g., a RAID group) or any other suitable mass storage device(s) including combinations and/or variations thereof. Storage of information in the mass storage subsystem 105 can be implemented as one or more storage volumes that comprise a collection of physical storage devices 112 cooperating to define an overall logical arrangement of volume block number (VBN) space on the volume(s). Each logical volume is generally, although not necessarily, associated with its own file system.

The storage devices within a logical volume/file system are typically organized as one or more groups, wherein each group may be operated as a Redundant Array of Independent (or Inexpensive) Disks (RAID). Most RAID implementations, e.g., a RAID-6 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-6 level implementation, although it should be understood that other types and levels of RAID implementations may be used according to the technology described herein. One or more RAID groups together form an aggregate. An aggregate can contain one or more volumes.

The storage server 108 can receive and respond to various read and write requests from the client systems (or clients) 104, directed to data stored in or to be stored in the storage subsystem 105.

Although the storage server 108 is illustrated as a single unit in FIG. 1, it can have a distributed architecture. For example, the storage server 108 can be designed as a physically separate network module (e.g., "N-blade") and disk module (e.g., "D-blade") (not illustrated), which communicate with each other over a physical interconnect. Such an architecture allows convenient scaling, e.g., by deploying two or more N-blades and D-blades, all capable of communicating with each other through the physical interconnect.

A storage server 108 can be configured to implement one or more virtual storage servers. Virtual storage servers allow the sharing of the underlying physical storage controller resources, (e.g., processors and memory, between virtual storage servers while allowing each virtual storage server to run its own operating system) thereby providing functional isolation. With this configuration, multiple server operating systems that previously ran on individual servers, (e.g., to avoid interference) are able to run on the same physical server because of the functional isolation provided by a virtual storage server implementation. This can be a more cost effective way of providing storage server solutions to multiple customers than providing separate physical servers for each customer.

As illustrated in the example of FIG. 1, storage server 108 includes cache system metadata 109. The cache system metadata 109 can be used to implement a cache tracking mechanism for generating predictive cache statistics for various cache sizes for a cache system 107 as described herein. The cache system 107 can be, for example, a flash memory system.

Although illustrated separately, the cache system 107 can be combined with the storage server 108. Alternatively or additionally, the cache system 107 can be physically and/or functionally distributed.

Figure 2:
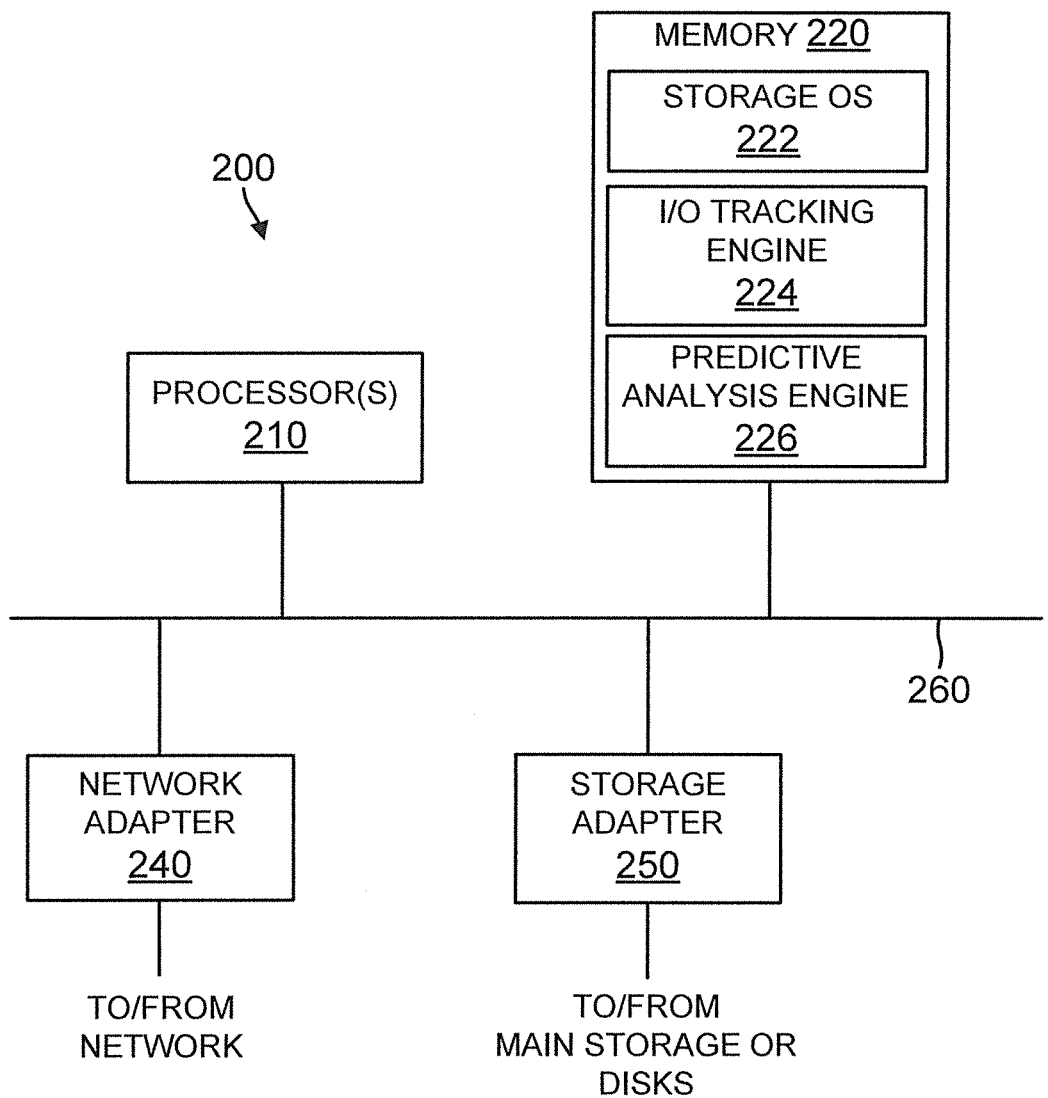
FIG. 2 is a block diagram illustrating an example of a storage controller that can implement one or more network storage servers, according to one aspect of the present disclosure.

Storage Controller:

FIG. 2 is a block diagram illustrating an example of the architecture of a storage controller 200 that can implement one or more network storage servers, for example, storage server 108 of FIG. 1. The storage server is a processing system that provides storage services relating to the organization of information at storage devices 112 of the mass storage subsystem 105. In an illustrative embodiment, the storage server 108 includes a processor subsystem 210 that includes one or more processors. The storage server 108 further includes a memory 220, a network adapter 240, and a storage adapter 250, at least some of which can be interconnected by an interconnect 260, e.g., a physical interconnect.

The storage server 108 can be embodied as a single or multi-processor storage server executing a storage operating system 222 that preferably implements a high-level module, called a storage manager, to logically organize data as a hierarchical structure of named directories, files, and/or data "blocks" on the storage devices 112. A block can be a sequence of bytes of specified length.

The memory 220 illustratively comprises storage locations that are addressable by the processor(s) 210 and adapters 240 and 250 for storing software program code and data associated with the technology introduced here. For example, some of the storage locations of memory 220 can be used to store an I/O tracking engine 224 and a predictive analysis engine 226.

The I/O tracking engine 224 can track the cache blocks of the simulated cache system 107 of FIG. 1 using a segmented cache metadata stored on the storage controller 200. More specifically, I/O tracking engine 224 can track the cache blocks of the simulated cache system 107 of FIG. 1 while performing a workload including various read and write requests (client-initiated input/output (I/O) operations) received from the client systems (or clients) 104 directed to data stored in or to be stored in the storage subsystem 105. The segmented cache metadata can be initialized such that each segment of the cache metadata corresponds to one or more of multiple cache sizes providing for the ability to concurrently track the multiple potential cache sizes. In some embodiments, it is possible to simultaneously track the multiple potential cache sizes.

The predictive analysis engine 226 can determine predictive statistics and/or analysis for the multiple simulated cache sizes concurrently using the corresponding segments of the cache metadata. Additionally, the predictive statistics and/or analysis can include performance comparisons of the multiple simulated cache sizes and recommendations based on the exemplary workload.

The storage operating system 222, portions of which are typically resident in memory and executed by the processing elements, functionally organizes the storage server 108 by (among other functions) invoking storage operations in support of the storage service provided by the storage server 108. It will be apparent to those skilled in the art that other processing and memory implementations, including various other non-transitory media, e.g., computer readable media, may be used for storing and executing program instructions pertaining to the technology introduced here. Similar to the storage server 108, the storage operating system 222 can be distributed, with modules of the storage system running on separate physical resources. In some embodiments, instructions or signals can be transmitted on transitory computer readable media, e.g., carrier waves or other computer readable media.

The network adapter 240 can include multiple ports to couple the storage server 108 with one or more clients 104, or other storage servers, over point-to-point links, wide area networks, virtual private networks implemented over a public network (Internet) or a shared local area network. The network adapter 240 thus can include the mechanical components as well as the electrical and signaling circuitry needed to connect the storage server 108 to the network 106. Illustratively, the network 106 can be embodied as an Ethernet network, a Fibre Channel network or any other network type. Each client 104 can communicate with the storage server 108 over the network 106 by exchanging packets or frames of data according to pre-defined protocols, e.g., Transmission Control Protocol/Internet Protocol (TCP/IP). It is noteworthy that clients 104 may be coupled to the storage server 108 directly without having to go through a network adapter or network 106. The various aspects described herein are not limited to a network or a direct connection.

The storage adapter 250 cooperates with the storage operating system 222 to access information requested by clients 104. The information may be stored on any type of attached array of writable storage media, e.g., magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on storage devices 112. The storage adapter 250 includes multiple ports having input/output (I/O) interface circuitry that couples with the disks over an I/O interconnect arrangement, e.g., a conventional high-performance, Fibre Channel link topology.

Figure 3:
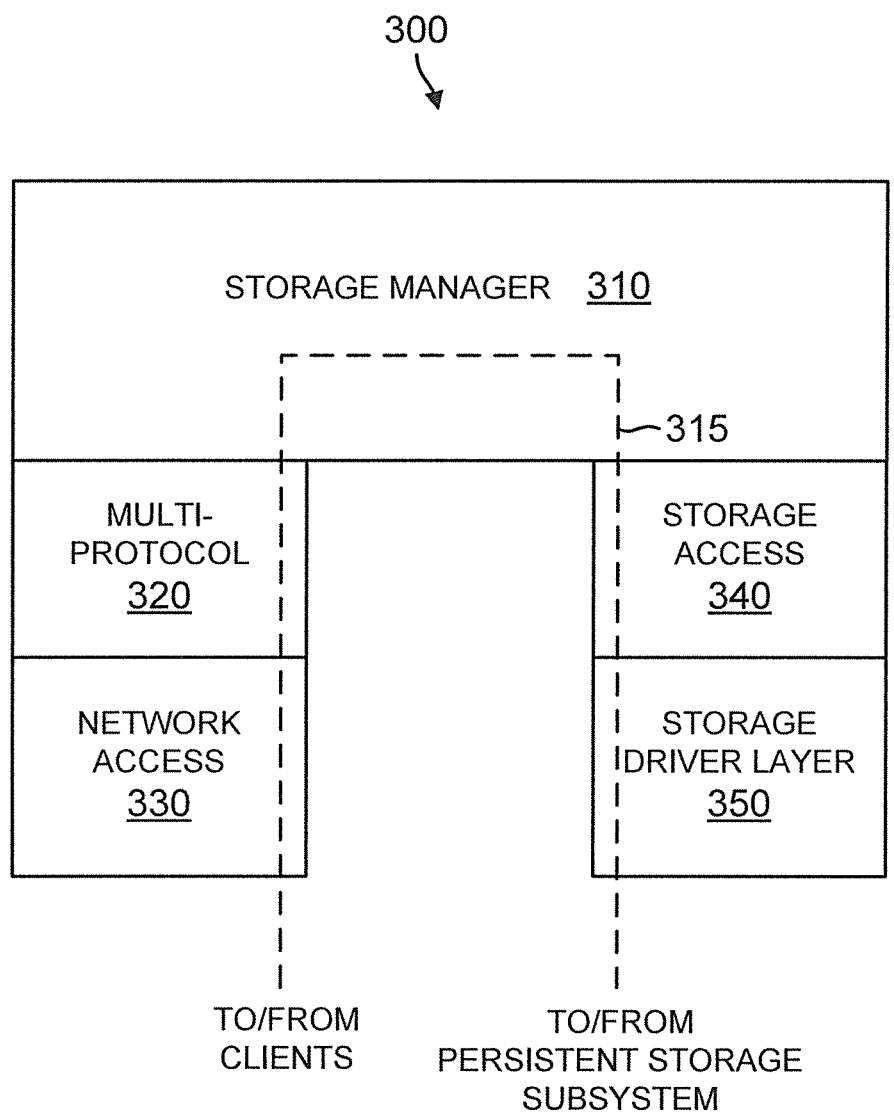
FIG. 3 is a schematic diagram illustrating an example of the architecture of a storage operating system in a storage server, according to one aspect of the present disclosure.

The storage operating system 222 facilitates clients' access to data stored on the storage devices 112. In certain embodiments, the storage operating system 222 implements a write-anywhere file system that cooperates with one or more virtualization modules to "virtualize" the storage space provided by storage devices 112. In certain embodiments, a storage manager element of the storage operation system 222 such as, for example storage manager 310 as illustrated in FIG. 3, logically organizes the information as a hierarchical structure of named directories and files on the storage devices 112. Each "on-disk" file may be implemented as a set of disk blocks configured to store information. As used herein, the term "file" means any logical container of data. The virtualization module(s) may allow the storage manager 310 to further logically organize information as a hierarchical structure of blocks on the disks that are exported as named logical units.

The interconnect 260 is an abstraction that represents any one or more separate physical buses, point-to-point connections, or both, connected by appropriate bridges, adapters, or controllers. The interconnect 260, therefore, may include, for example, a system bus, a form of Peripheral Component Interconnect (PCI) bus, a HyperTransport or industry standard architecture (ISA) bus, a small computer system interface (SCSI) bus, a universal serial bus (USB), TIC (I2C) bus, or an Institute of Electrical and Electronics Engineers (IEEE) standard 1394 bus, also called "Firewire," Fibre-Channel, Thunderbolt, and/or any other suitable form of physical connection including combinations and/or variations thereof.

Storage Operating System:

FIG. 3 is a schematic diagram illustrating an example of the architecture 300 of a storage operating system 222 for use in a storage server 108. In some embodiments, the storage operating system 222 can be the NetApp® Data ONTAP® operating system available from NetApp, Inc., Sunnyvale, Calif. that implements a Write Anywhere File Layout (WAFL®) file system (without derogation of any trademark rights). However, another storage operating system may alternatively be designed or enhanced for use in accordance with the technology described herein.

The storage operating system 222 can be implemented as programmable circuitry programmed with software and/or firmware, or as specially designed non-programmable circuitry (i.e., hardware), or in a combination and/or variation thereof. In the illustrated embodiment, the storage operating system 222 includes several modules, or layers. These layers include a storage manager (or file system manager) 310, which is a functional element of the storage operating system 222. The storage manager 310 imposes a structure (e.g., one or more file systems) on the data managed by the storage server 108 and services read and write requests from clients 104.

To allow the storage server to communicate over the network 106 (e.g., with clients 104), the storage operating system 222 can also include a multi-protocol layer 320 and a network access layer 330, logically under the storage manager 310. The multi-protocol layer 320 implements various higher-level network protocols, e.g., Network File System (NFS), Common Internet File System (CIFS), Hypertext Transfer Protocol (HTTP), Fibre Channel, Infini-Band, Serial Attached Small Computer System Interface (SAS) and/or Internet small computer system interface (iSCSI), to make data stored on the storage devices 112 available to users and/or application programs. The network access layer 330 includes one or more network drivers that implement one or more lower-level protocols to communicate over the network, e.g., Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105 of FIG. 1), the storage operating system 222 includes a storage access layer 340 and an associated storage driver layer 350 logically under the storage manager 310. The storage access layer 340 implements a higher-level storage redundancy algorithm, e.g., RAID-4, RAID-5, RAID-6, or RAID DP®. The storage driver layer 350 implements a lower-level storage device access protocol, e.g., Fibre Channel Protocol or SAS.

Also shown in FIG. 3 is the path 315 of data flow through the storage operating system 222, associated with a read or write operation, from the client interface to the storage interface. Thus, the storage manager 310 accesses a storage subsystem, e.g., storage system 105 of FIG. 1, through the storage access layer 340 and the storage driver layer 350. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

File System Structure:

It is useful now to consider how data can be structured and organized in a file system by storage controllers such as, for example, storage server 108 of FIG. 1, according to certain embodiments. The term "file system" is used herein only to facilitate description and does not imply that the stored data must be stored in the form of "files" in a traditional sense; that is, a "file system" as the term is used herein can store data in the form of blocks, logical units (LUNs) and/or any other type(s) of units.

In at least some embodiments, data is stored in volumes. A "volume" is a logical container of stored data associated with a collection of mass storage devices, e.g., disks, which obtains its storage from (e.g., is contained within) an aggregate, and which is managed as an independent administrative unit, e.g., a complete file system. Each volume can contain data in the form of one or more directories, subdirectories, qtrees, files and/or files. An "aggregate" is a pool of storage that combines one or more physical mass storage devices (e.g., disks) or parts thereof into a single logical storage object. An aggregate contains or provides storage for one or more other logical data sets at a higher level of abstraction, e.g., volumes.

Figure 4A:
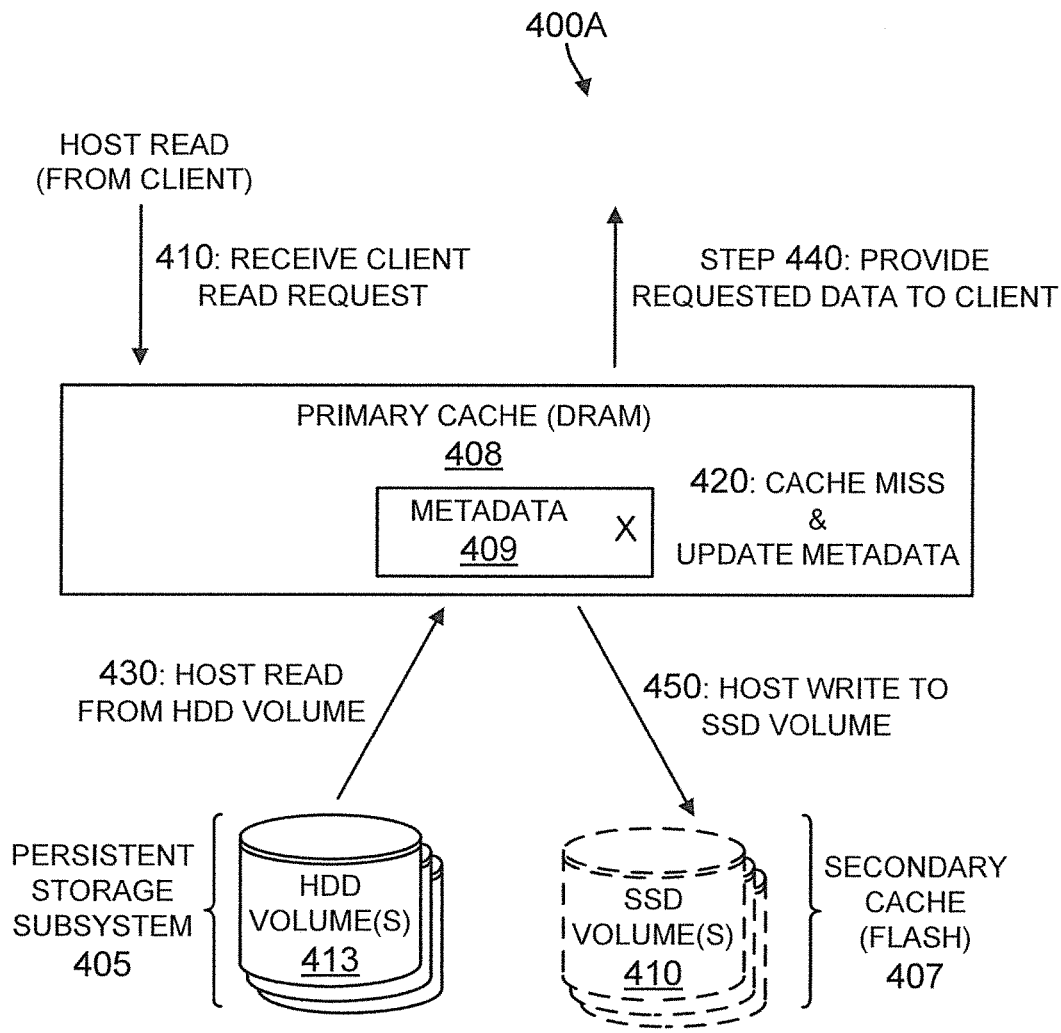
FIGS. 4A and 4B are block diagrams illustrating an example of tracking a simulated secondary cache system using cache block metadata stored on a primary cache system.
Figure 4B:
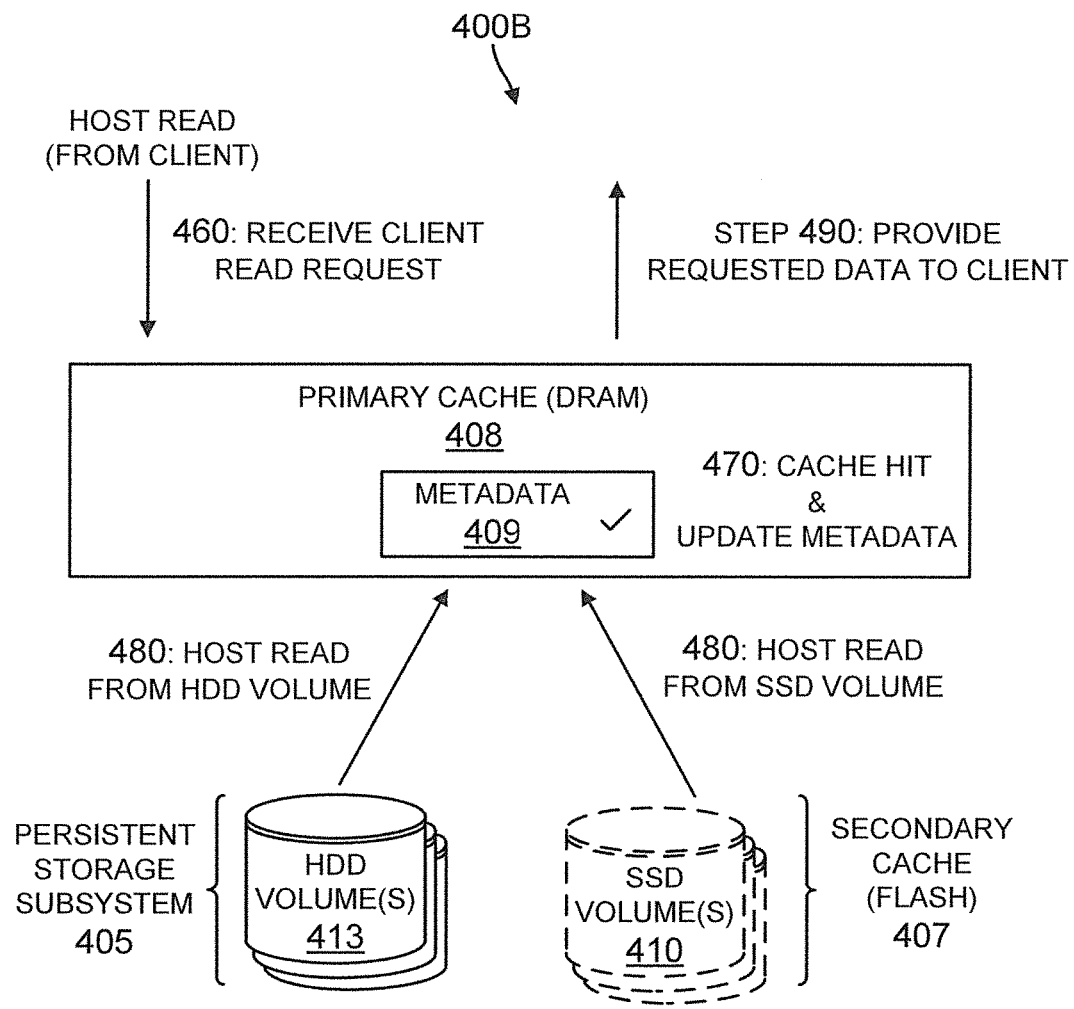

Predictive Cache Statistics:

FIGS. 4A and 4B show block diagrams 400A and 4008, respectively, illustrating an example of tracking a simulated secondary cache system using cache block metadata stored on a primary cache system. More specifically, FIGS. 4A and 4B illustrate an example cache read miss and an example cache read hit, respectively, occurring while tracking a simulated secondary cache system 407 using segmented metadata stored on a primary cache system.

In the examples of FIGS. 4A and 4B, a storage server (not illustrated) such as, for example, storage server 108 of FIG. 1, includes a primary cache system 408 having segmented metadata 409 stored thereon for tracking simulated cache blocks of a secondary cache system 407 while performing a workload including a client-initiated read request (operation). The primary cache system 408 can be, for example, a dynamic random access memory (DRAM) and the secondary cache system 407 can be a flash read cache system including multiple SSD volumes 410.

In some embodiments, the secondary cache 407 can be, in whole or in part, simulated. That is, the segmented metadata 409 can be used to track simulated cache blocks on a secondary cache system 407 that does not exist or that includes only a fraction of the maximum supported cache size. Thus, the system can generate predictive cache statistics for various cache sizes up to a maximum supported cache size without requiring a system operator to pre-purchase and/or otherwise configure a secondary cache system 407.

The secondary cache system 407 is illustrated with a dotted-line because the storage system may be configured without a secondary cache system 407 or with a secondary cache system 407 of particular size that is less than the maximum supported (or configurable) cache size for the storage system. In such cases, the storage system may or may not use the secondary cache system 407 in performing the workload including various read and/or write requests (client-initiated I/O operations) received from client systems (or clients).

Referring first to FIG. 4A, at stage 410 a client read (or host read) request directed to data persistently stored in the persistent storage subsystem 405 is received and processed by the storage system to determine a read location or logical block address (LBA) associated with the read request from which to read requested data. Responsive to the read request, at stage 420, the storage system checks the segmented metadata 409 to determine if the read data is stored on the simulated secondary cache 407 using the read location or LBA. As discussed above, while the simulated secondary cache 407 may not exist or may only exist in part, the segmented metadata can track the maximum configurable size of the simulated secondary cache 407.

In some embodiments, the cache block metadata can comprise a linked-list data structure having multiple cache metadata blocks that each include particular LBA indicating the LBAs that are located (stored) on the simulated secondary cache 407. Thus, the storage system may traverse the cache block metadata to determine if the read location or LBA is indicated. If so, then a cache hit (or simulated cache hit) occurs and, if not, then a cache miss (or simulated cache miss) occurs.

In the example of FIG. 4A, at stage 420, the storage server reads, checks, and/or otherwise traverses or interrogates the segmented metadata 409 to determine that the read location or LBA associated with the received client request is not indicated by the cache metadata and thus, a cache miss occurs. The storage system makes a record and/or otherwise records that the cache miss occurred and updates the segmented metadata 409 accordingly.

The storage system then, at stage 430 reads the requested read data from the read location or LBA on one or more of the HDD volumes 413 of the persistent storage subsystem 405 and, at stage 440, provides the requested data to the client responsive to the read request. Optionally, at stage 450, the storage system writes the read data to the secondary cache system (if it exists for the particular LBA). In some embodiments, the segmented metadata 409 utilizes a least recently used (LRU) based cache tracking mechanism with segment tracking pointers and segment identifiers added to the metadata structures. Examples implementing an LRU based cache tracking are illustrated and discussed in greater detail with respect to FIGS. 8-9 and FIGS. 10A-11B.

The example of FIG. 4B is similar to the example of FIG. 4A but illustrates a simulated cache hit. At stage 460 a client read (or host read) request directed to data persistently stored in the persistent storage subsystem 405 is received and processed by the storage system to determine a read location or logical block address (LBA) associated with the read request from which to read requested data. Responsive to the read request, the storage system checks the segmented metadata 409 to determine if the read data is stored on the simulated secondary cache 407 using the read location or LBA. As discussed above, while the simulated secondary cache 407 may not exist or may only exist in part, the segmented metadata can track the maximum configurable size of the simulated secondary cache 407.

In the example of FIG. 4B, at stage 470, the storage server reads, checks, and/or otherwise traverses or interrogates the segmented metadata 409 to determine that the read location or LBA associated with the received client request is indicated by the cache metadata and thus, a cache hit occurs. The storage system then determines on which of various cache sizes a cache hit would have occurred based on the segment in which the cache hit occurred. For example, a cache hit in the last segment of the segmented cache metadata 409 in may result in a cache hit only for the maximum supported (or simulated) cache size.

In some embodiments, the segmented metadata 409 is configured to utilize a least recently used (LRU) based cache tracking mechanism with segment tracking pointers and segment identifiers added to the metadata structures. The segments correspond to multiple cache sizes and the LRU is established to track the maximum cache size. As discussed above, each segment of the segmented cache metadata 409 corresponds to one or more of the various cache sizes for the cache system. Consequently, the storage system can determine on which of the various cache sizes the cache hit.

In some embodiments, there need not be actual cache blocks corresponding to the secondary cache 407. That is, the secondary cache 407 can be simulated and the segmented metadata 409 can be used to simulate the predictive cache statistics while servicing data access requests using the persistent storage subsystem 405. Alternatively, the simulation can be run on the workload using a fraction of the maximum (simulated) secondary cache size.

Once the metadata is updated, the storage system can then record the cache hit for those various cache sizes that a cache hit would have occurred. At stage 480, the storage system reads the requested read data from the read location or LBA on one or more of the HDD volumes 413 of the persistent storage subsystem 405 or the secondary cache system 407 (flash-based system) depending on whether or not the data is available on the secondary cache system 407. As discussed, the secondary cache system 407 may be a simulated system and thus not exist in whole or in part. For example, the actual size of a secondary cache system 407 may be less than the simulated secondary cache system in which case some of the read data (even in the case of a cache hit) is not available on the secondary cache system 407 and thus is read from the HDD volumes 413 of the persistent storage subsystem 405.

Lastly, at stage 490, the storage system provides the requested data to the client responsive to the read request.

Figure 5:
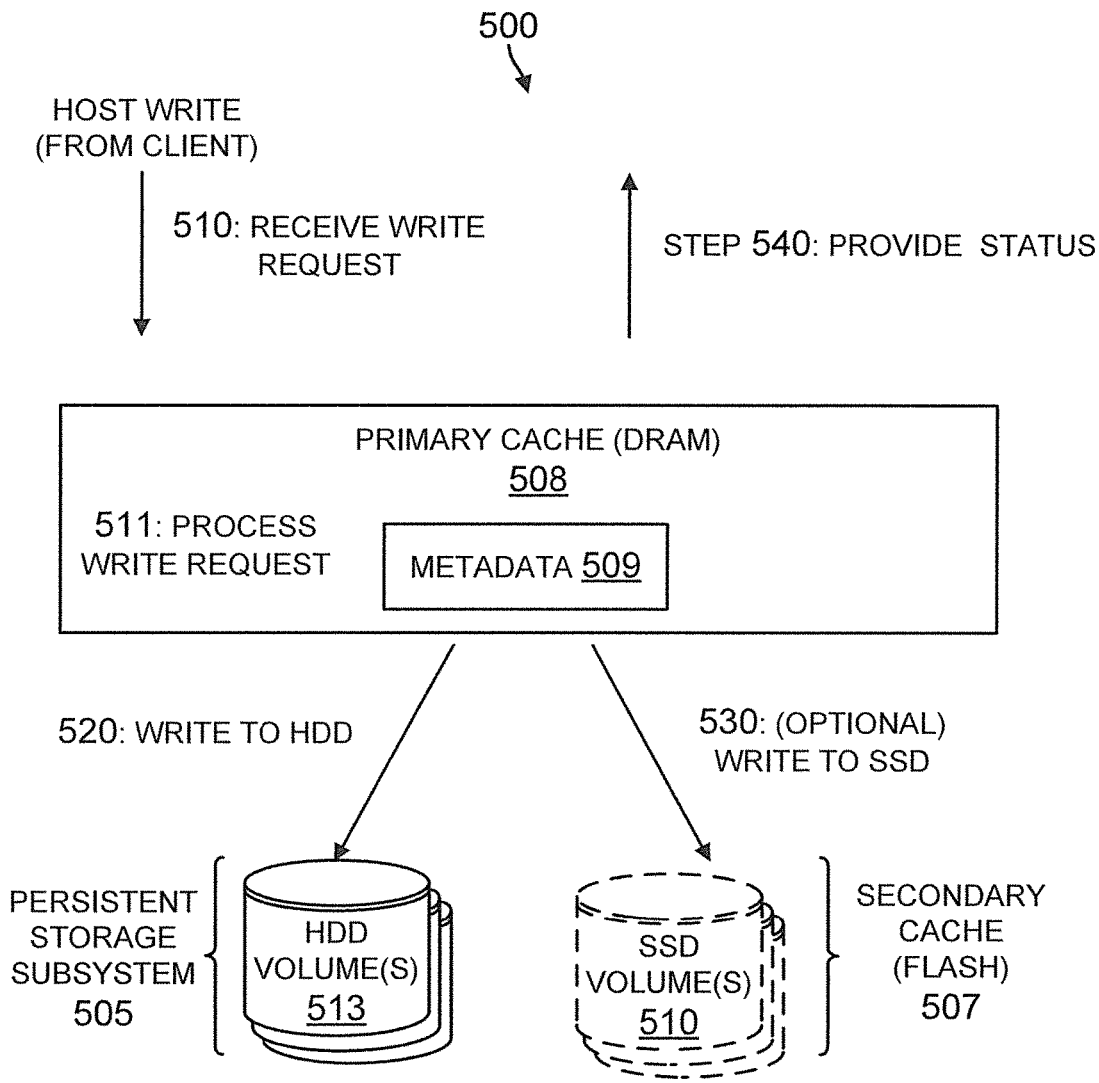
FIG. 5 is a block diagram illustrating an example for tracking a simulated secondary cache system using cache block metadata stored on a primary cache system, according to one aspect of the present disclosure.

FIG. 5 is a block diagram 500 showing an example for tracking a simulated secondary cache system 507 using cache block metadata 509 stored on a primary cache system 508. More specifically, FIG. 5 illustrates an example of tracking a simulated secondary cache system 507 using segmented cache block metadata 509 responsive to client-initiated write request.

In the example of FIG. 5, a storage server (not illustrated) such as, for example, storage server 108 of FIG. 1, includes a primary cache system 508 having segmented metadata 509 stored thereon for tracking simulated cache blocks of a secondary cache system 507 while performing a workload including a client-initiated read request (operation). The primary cache system 508 can be, for example, a dynamic random access memory (DRAM) and the secondary cache system 507 can be a flash read cache system including multiple SSD volumes 510.

At stage 511 a client write (or host write) request directed to the persistent storage subsystem 505 is received and processed by the storage system to determine a write location or logical block address (LEA) associated with the write request. Responsive to the write request, at stages 520 and 530, the storage system writes to the persistent storage subsystem 505 and optionally to the secondary cache 507, respectively. Lastly, at stage 540, the storage system provides a response or status that the write was successful.

Figure 6:
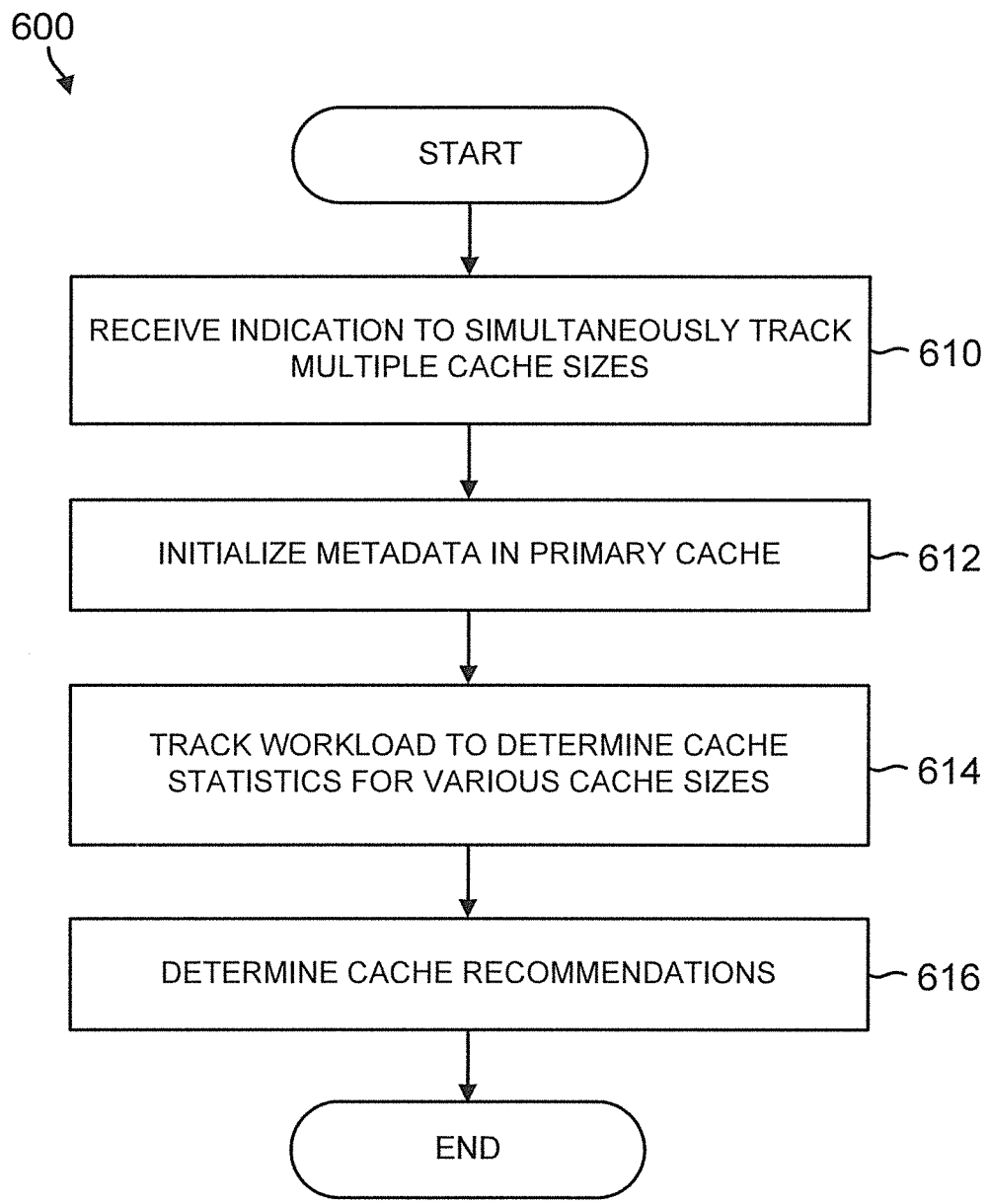
FIG. 6 is a flow diagram illustrating an example process for generating predictive cache statistics for various cache sizes, according to one aspect of the present disclosure.

Process Flows:

FIG. 6 is a flow diagram illustrating an example process 600 for generating predictive cache statistics for multiple cache sizes. A storage controller e.g., storage controller 200 of FIG. 2, among other functions, can perform the example process 600. In particular, an I/O tracking engine such as, for example, I/O tracking engine 224 of FIG. 2 and a predictive analysis engine such as, for example, predictive analysis engine 226 of FIG. 2 can, among other functions, perform process 600. The I/O tracking engine and the predictive analysis engine may be embodied as hardware and/or software, including combinations and/or variations thereof. In addition, in some embodiments, the I/O tracking engine and/or the predictive analysis engine can include instructions, wherein the instruction when executed by one or more processors of a storage controller, cause the storage controller to perform one or more steps including the following steps.

In a receive stage, at step 610, the storage controller receives an indication to track multiple cache sizes. For example, the storage controller can receive an indication to track multiple cache sizes from an administrator seeking to determine an optimal flash-based cache size for a secondary cache system.

In an initialization stage, at step 612, the storage controller initializes the metadata in a primary cache. In a track stage, at step 614, the storage controller tracks an exemplary workload to determine cache statistics for various cache sizes. In a stage, at step 616, the storage controller processes the cache statistics to determine additional cache statistics and to determine optional cache recommendations. For example, the storage controller can process the hit ratios for each of the memories to determine an estimated average I/O response time, an estimated overall workload response time, an estimated total response time for the exemplary workload. This may be determined using known estimates for read response times of SSD (cache) vs. HDD.

In some embodiments, the storage controller can determine and/or provide characteristics of the workload (working data set) such as, for example, the size of the workload, cacheability of the workload (e.g., locality of repeated reads, whether cacheable or not), etc.

In some embodiments, the storage controller can also apply various caching algorithms to a workload. In this case, additional cache metadata or a second cache metadata can be utilized.

Figure 7:
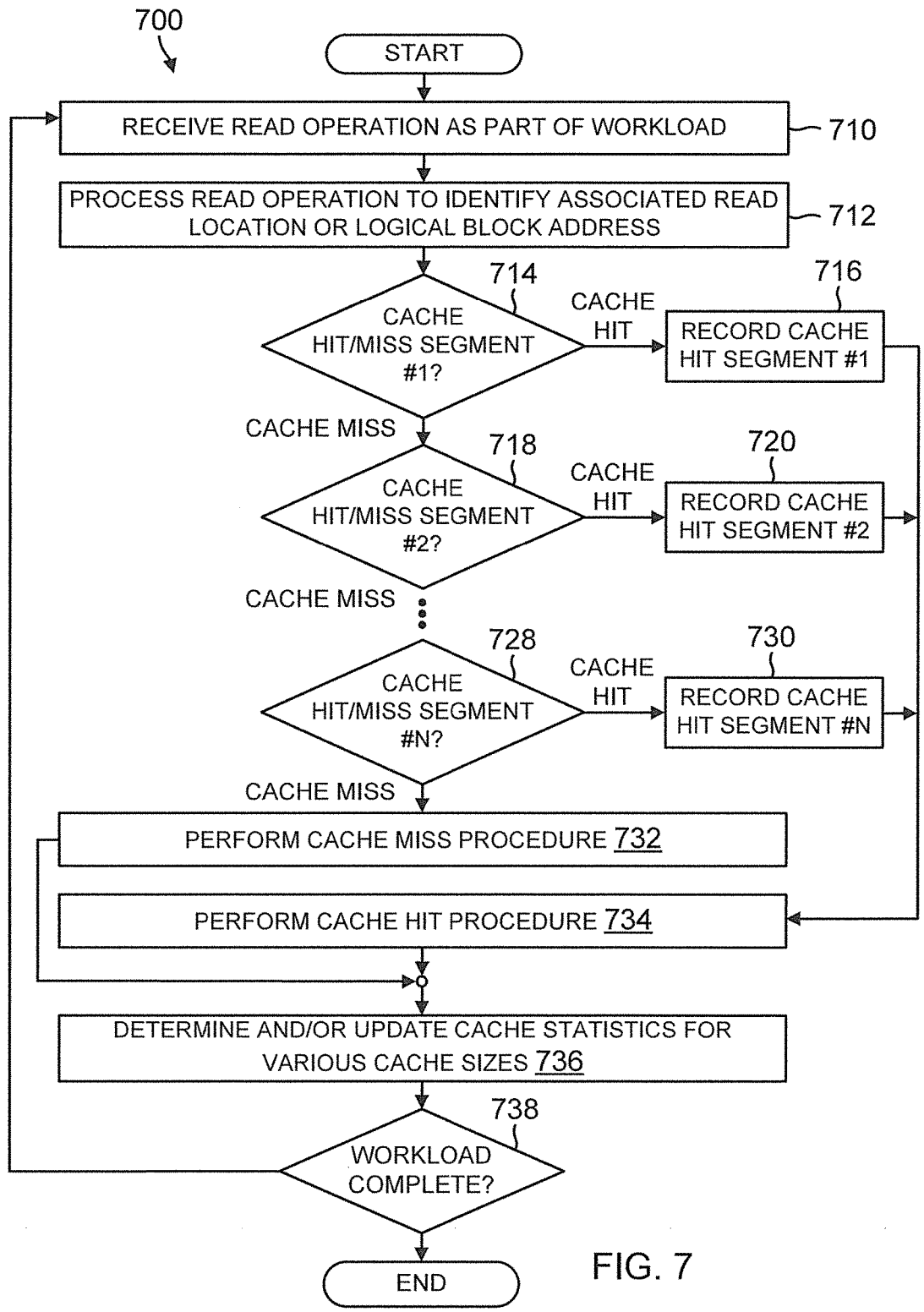
FIG. 7 is a flow diagram illustrating an example process for tracking a workload to determine cache statistics for various cache sizes, according to one aspect of the present disclosure.

FIG. 7 is a flow diagram illustrating an example process 700 for tracking a workload (or working dataset) to determine cache statistics for various cache sizes. A storage controller e.g., storage controller 200 of FIG. 2, among other functions, can perform the example process 700. Specifically, an I/O tracking engine of a storage controller such as, for example, I/O tracking engine 224 of FIG. 2 can, among other functions, perform process 700. The I/O tracking engine may be embodied as hardware and/or software, including combinations and/or variations thereof. In addition, in some embodiments, the I/O tracking engine can include instructions, wherein the instructions, when executed by one or more processors of a storage controller, cause the storage controller to perform one or more steps including the following steps.

In receive stage 710, the storage controller receives a client-initiated read request as part of the workload (or working dataset). As discussed above, the workload can include various read and write requests (client-initiated I/O operations) that are received from client systems (or clients). In process stage 712, the storage controller processes the client-initiated read operation to identify a read location or LBA associated with the read request wherein the read location or LBA indicates a location from which the read request is attempting to read requested data.

In decision cache hit/miss stage 714, the storage controller determines if a first segment (segment #1) is a cache hit or miss. The storage system can make this determination by, for example, checking the segmented metadata (e.g., segmented metadata 409) to determine if the read data is stored on a simulated cache (e.g., secondary cache 407) for which the system is attempting to generate predictive cache statistics. If a cache hit is detected for segment #1, then it is recorded at stage 716. The process then continues on to a cache hit stage 734. Otherwise, if a cache miss is detected for segment #1, then the process continues on to the next decision cache hit/miss stage, stage 718.

In decision cache hit/miss stage 718, the storage controller determines if a second segment (segment #2) is a cache hit or miss. The storage system can make this determination in the same or similar manner to stage 714. If a cache hit is detected for segment #2, then it is recorded at stage 720. The process then continues on to a cache hit stage 734. Otherwise, if a cache miss is detected for segment #2, then the process continues on to the next decision cache hit/miss stage. This process continues for each segment of the cache metadata.

In decision cache hit/miss stage 728, the storage controller determines if a last segment of the cache metadata (segment #N) is a cache hit or miss. If a cache hit is detected for segment #N, then it is recorded at stage 730. The process then continues on to a cache hit stage 734. Otherwise, if a cache miss is detected for segment #N, then the read request is determined to be a cache miss for the entire segmented cache and continues on to a cache miss stage 732.

In cache miss stage 732, the storage controller performs a cache miss procedure. The cache miss procedure can vary depending on the cache tracking mechanism utilized by the storage controller. An example of a cache miss procedure for a LRU-based cache tracking mechanism with segment tracking pointers and segment identifiers added to the metadata structures is illustrated and discussed in greater detail with respect to FIG. 8.

In cache hit stage 734, the storage controller performs a cache hit procedure. Like the cache miss procedure, the cache hit procedure can also vary depending on the cache tracking mechanism utilized by the storage controller. An example of a cache hit procedure for a LRU-based cache tracking mechanism with segment tracking pointers and segment identifiers added to the metadata structures is illustrated and discussed in greater detail with respect to FIG. 9.

Figure 8:
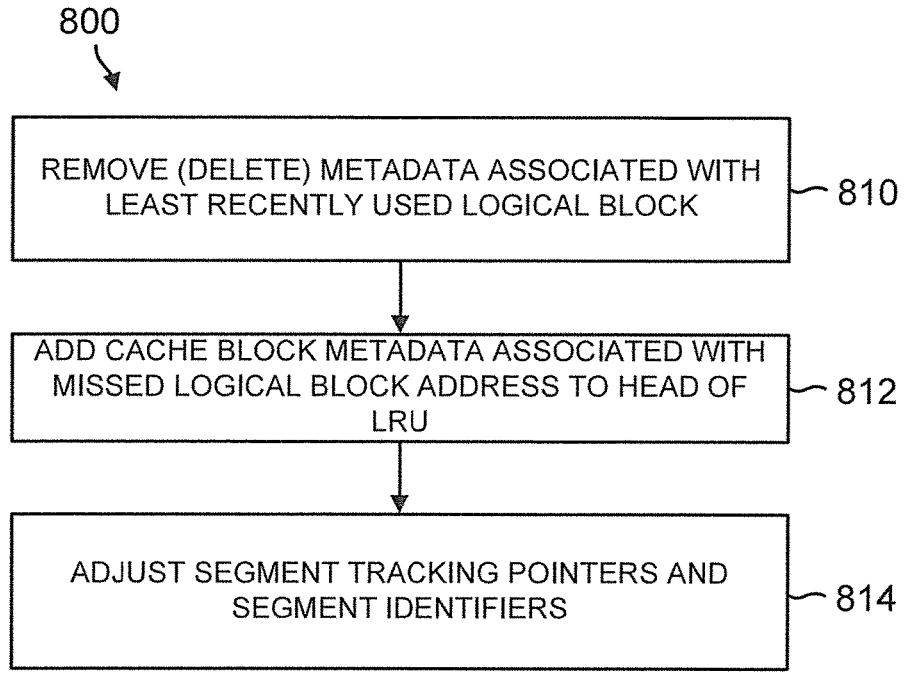
FIG. 8 is a flow diagram illustrating an example cache miss process for generating predictive cache statistics for various cache sizes, according to one aspect of the present disclosure.

In a determination stage 736, the storage controller determines and/or updates cache statistics for the various cache sizes of the cache system. For example, the storage controller can update a hit ratio for each of the various cache sizes based on the segments that were marked as cache hits. Additionally, the storage FIG. 8 is a flow diagram illustrating an example cache miss process 800 for generating predictive cache statistics for various cache sizes. Example process 800 is discussed primarily with respect to a LRU-based cache tracking mechanism, however, as discussed above, other cache tracking mechanisms can also be utilized.

A storage controller e.g., storage controller 200 of FIG. 2, among other functions, can perform the example process 800. Specifically, an I/O tracking engine of a storage controller such as, for example, I/O tracking engine 224 of FIG. 2 can, among other functions, can perform process 800. The I/O tracking engine may be embodied as hardware and/or software, including combinations and/or variations thereof. In addition, in some embodiments, the I/O tracking engine can include instructions, wherein the instructions, when executed by one or more processors of a storage controller, cause the storage controller to perform one or more steps including the following steps. The example cache miss procedure 800 of FIG. 8 is described in conjunction with FIGS. 11A-11B which illustrate example operation of a LRU-based cache tracking mechanism with segment tracking pointers and segment identifiers added to the cache block metadata.

Figure 11A:
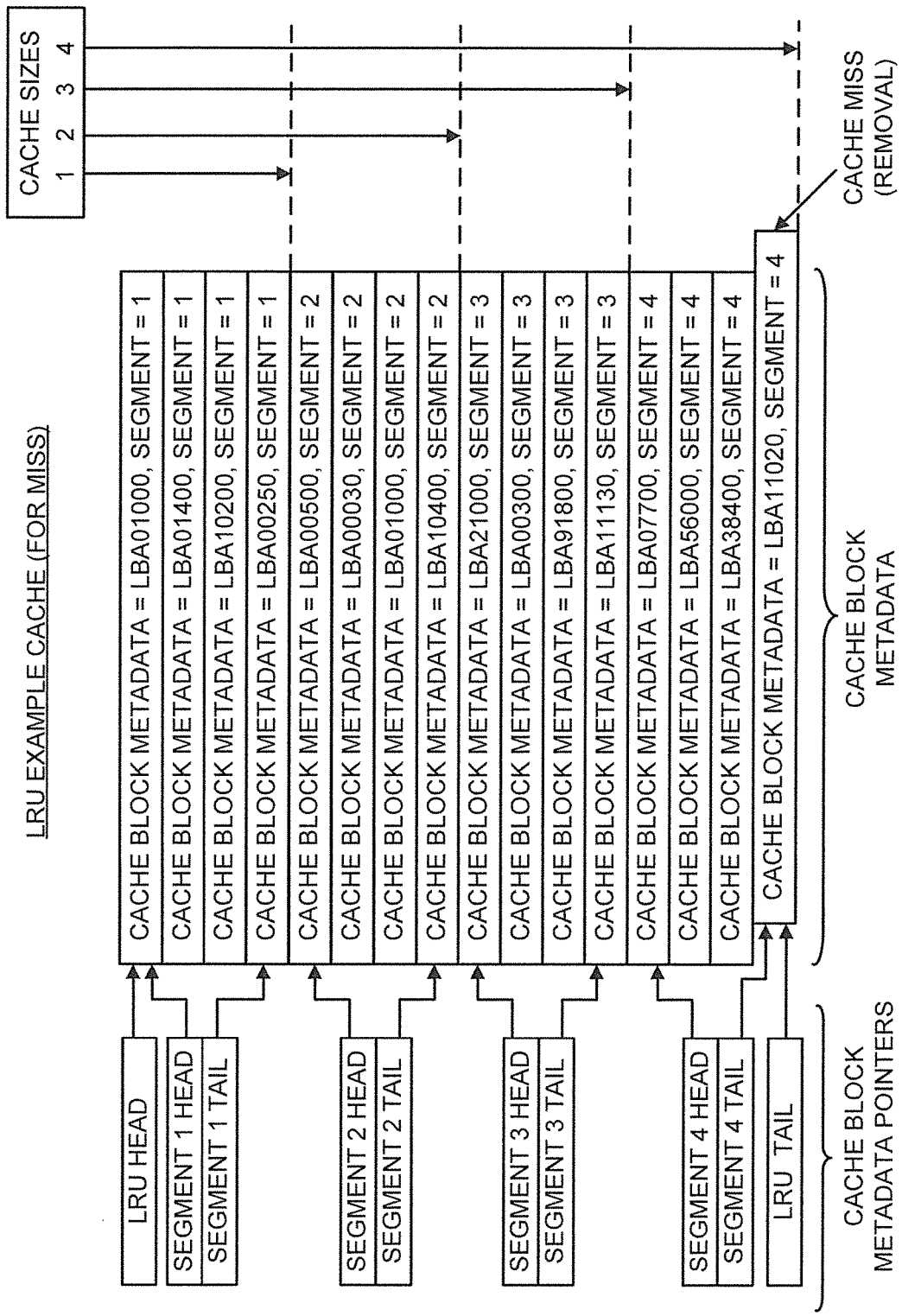
FIGS. 11A and 11B are block diagrams illustrating example operation of a least recently used cache tracking mechanism with segment tracking pointers and segment identifiers added to the cache block metadata prior to and after a cache miss, according to one aspect of the present disclosure.

Prior to executing example process 800, the storage controller has determined that a read request is a cache miss for the entire segmented cache and thus proceeds to the cache miss procedure 800. At a removal stage 810, the storage controller removes (deletes) a metadata cache block associated with the least recently used logical cache block. An example of this removal is illustrated in FIG. 11A. In some embodiments, removal occurs when all metadata cache blocks are in use. That is, when all metadata cache blocks are not in use, some are in a "free" state (not assigned to an LBA). Initially, the cache is empty and all metadata cache blocks are in the "free" state. For a cache miss, a "free" metadata block is used first if available. Otherwise, a cache metadata block is recycled from the LRU.

At an addition stage 812, the storage controller adds a cache block metadata associated with the missed read request (or location or LBA) to the head of the cache block metadata. Lastly, at an adjustment stage 814, the storage controller adjusts the segment tracking points and/or segment identifiers. Stages 812 and 814 are illustrated and discussed in greater detail with reference to FIG. 11B.

Figure 9:
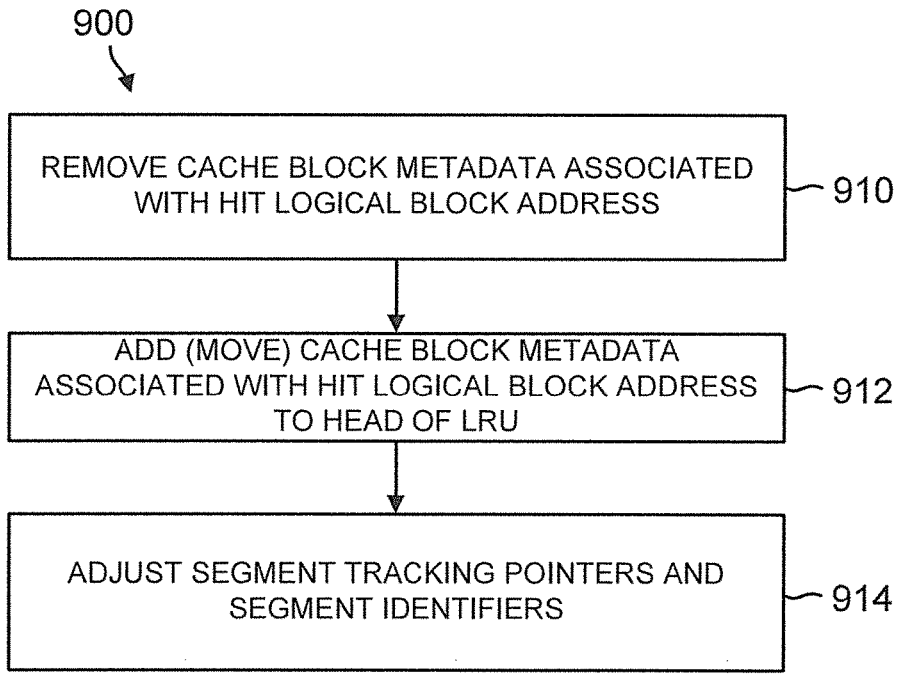
FIG. 9 is a flow diagram illustrating illustrates an example cache hit process for generating predictive cache statistics for various cache sizes, according to one aspect of the present disclosure.

FIG. 9 is a flow diagram illustrating an example cache hit process 900 for generating predictive cache statistics for various cache sizes. Example process 900 is discussed primarily with respect to a LRU-based cache tracking mechanism, however, as discussed above, other cache tracking mechanisms can also be utilized.

A storage controller e.g., storage controller 200 of FIG. 2, among other functions, can perform the example process 900. Specifically, an I/O tracking engine of a storage controller such as, for example, I/O tracking engine 224 of FIG. 2 can, among other functions, can perform process 900. The I/O tracking engine may be embodied as hardware and/or software, including combinations and/or variations thereof. In addition, in some embodiments, the I/O tracking engine can include instructions, wherein the instructions, when executed by one or more processors of a storage controller, cause the storage controller to perform one or more steps including the following steps. The example cache hit procedure 900 of Figure is described in conjunction with FIGS. 10A-10B which illustrate example operation of a LRU-based cache tracking mechanism with segment tracking pointers and segment identifiers added to the cache block metadata.

Figure 10A:
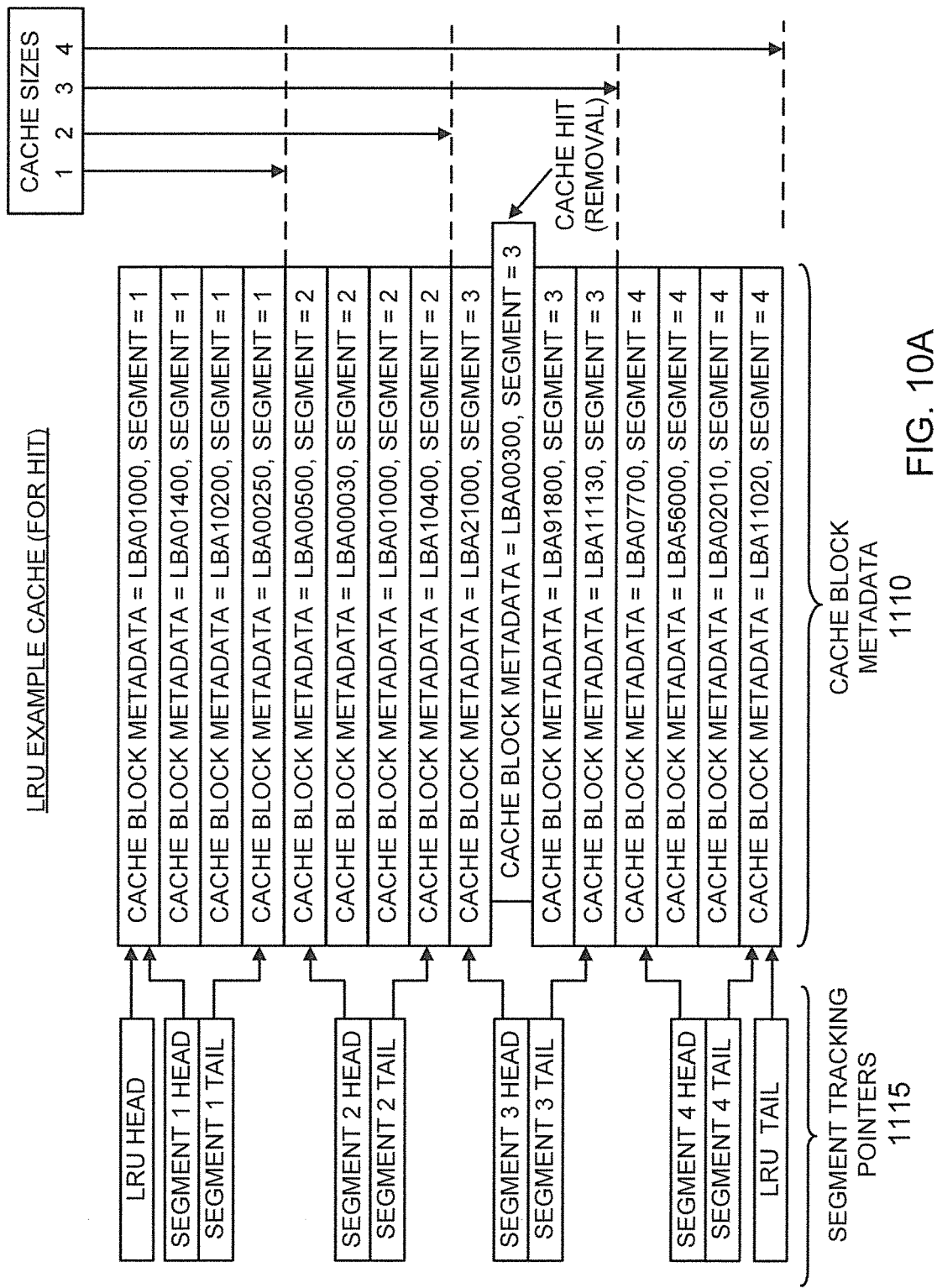
FIGS. 10A and 10B are block diagrams illustrating example operation of a least recently used cache tracking mechanism with segment tracking pointers and segment identifiers added to cache block metadata prior to and after a cache hit, according to one aspect of the present disclosure.

Prior to executing example process 900, the storage controller has determined that a read request is a cache hit and thus proceeds to the cache hit procedure 900. At a removal stage 910, the storage controller removes the metadata cache block associated with the cache hit block. An example of this removal is illustrated in FIG. 10A. At an addition stage 912, the storage controller adds the removed cache block metadata associated with the cache hit to the head of the cache block metadata. Lastly, at an adjustment stage 914, the storage controller adjusts the segment tracking points and/or segment identifiers. Stages 912 and 914 are illustrated and discussed in greater detail with reference to FIG. 10B.

FIGS. 10A-10B and 11A-11B are block diagrams illustrating example operations of a LRU-based cache tracking mechanism prior to and subsequent to a cache hit and prior to and subsequent to a miss hit, respectively. The example includes cache block metadata 1110 having segment tracking pointers 1115 and segment identifiers added to the metadata structures. The storage system utilizes the segment tracking pointers 1115 and/or the segment identifiers to identify the various segments of the cache block metadata 1110.

As discussed herein, the segments correspond to various cache sizes. In the example of FIGS. 10A-11B, the segments correspond (or represent) four cache sizes, however, the segment tracking pointers 1115 and/or the segment identifiers can be configured to track any number of cache sizes. In the example of FIGS. 10A-11B, by way of example and not limitation, the cache block metadata 1110 is divided into four equal segments each comprising a percentage of the maximum supported (or simulated) cache size. Although the cache block metadata 1110 is divided into equal segments in the examples provided, the cache block metadata 1110 can be divided by the segments in any manner (including unequal segments) to properly simulate the various cache sizes. Additionally, in some embodiments, the various cache sizes simulated can be selectable and/or otherwise configurable.

Figure 10B:
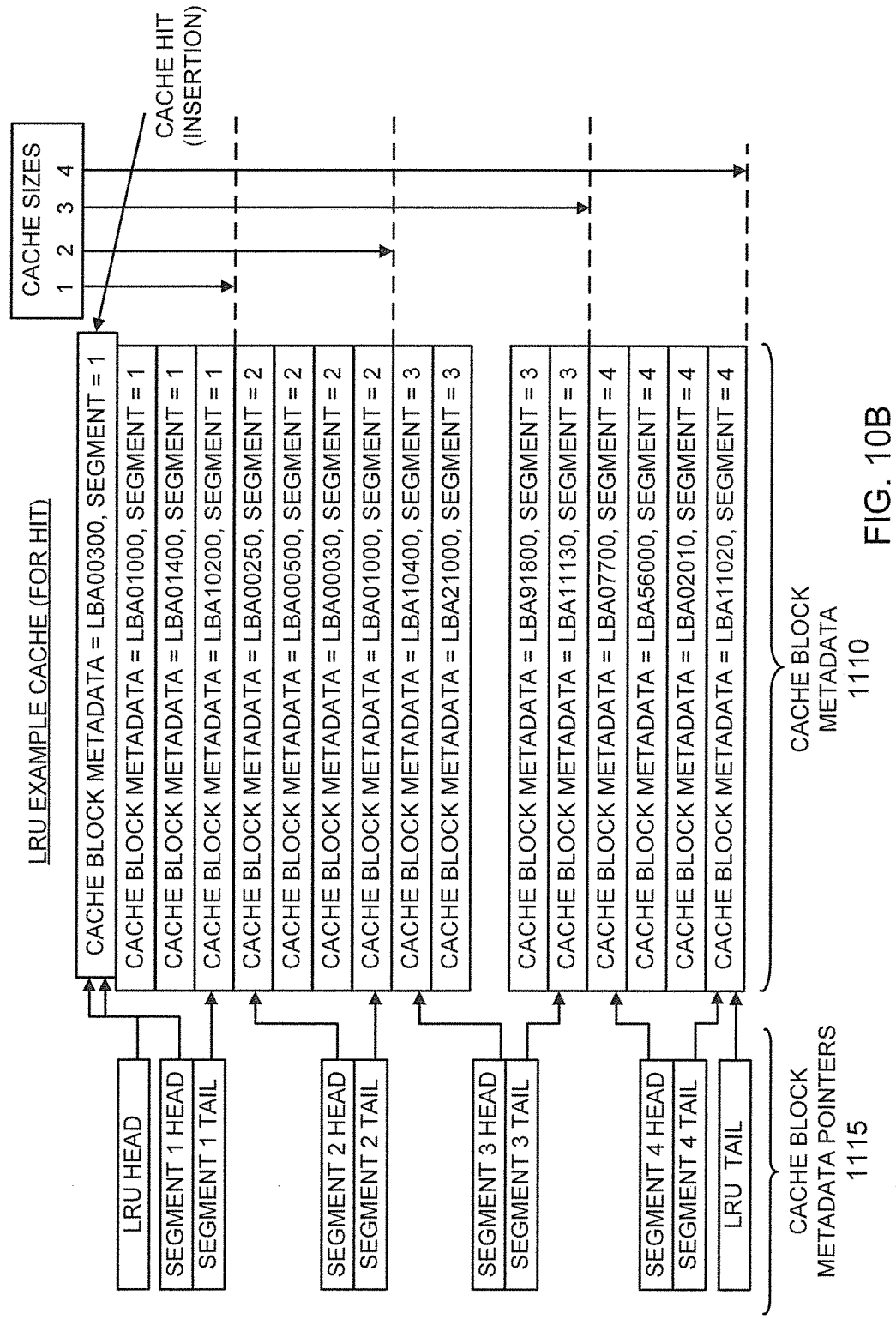

Referring first to FIGS. 10A and 10B which illustrate example operations of a LRU-based cache tracking mechanism with segment tracking pointers and segment identifiers added to cache block metadata prior to and subsequent to a cache hit. In this example, a cache read is received and an associated read location or LBA associated with the read request from which to read requested data is determined. In some embodiments, the storage controller then traverses a linked list starting from the LRU head pointer to determine that the cache read is a hit on the simulated cache system. While traversing the LRU linked list, it is possible to find the cache block metadata. However, this technique can be slow due to the potentially very large number of metadata elements. In some embodiments, the look-up of the cache block metadata is done through the use of a hash table and a different linked list that links cache block metadata together. Accordingly, in some embodiments, there can be two linked list elements in each cache block metadata, one linked list element for the LRU linked list and another linked list element for the hash table linked lists.

As illustrated in FIG. 10A, a cache hit is detected for "LBA00300" and the storage controller responsively removes the metadata block. Subsequently, as illustrated in FIG. 10B, the metadata block is inserted at the head of the cache block metadata 1110 and the cache block metadata pointers 1115 and segment identifiers are adjusted accordingly. In this example, the LRU head pointer and the segment 1 head pointer are moved from the "LBA01000" metadata block to the "LBA00300" metadata block and the segment identifier for the "LBA00300" metadata block is modified from segment 3 to segment 1; the segment 1 tail pointer is moved from the "LBA00250" metadata block to the "LBA10200" metadata block; the segment 2 head pointer is moved from the "LBA00500" metadata block to the "LBA00250" metadata block and the segment identifier for the "LBA00250" metadata block is modified from segment 1 to segment 2; the segment 2 tail pointer is moved from the "LBA10400" metadata block to the "LBA01000" metadata block; and the segment 3 head pointer is moved from the "LBA21000" metadata block to the "LBA10400" metadata block and the segment identifier for the "LBA104000" metadata block is modified from segment 2 to segment 3.

Figure 11B:
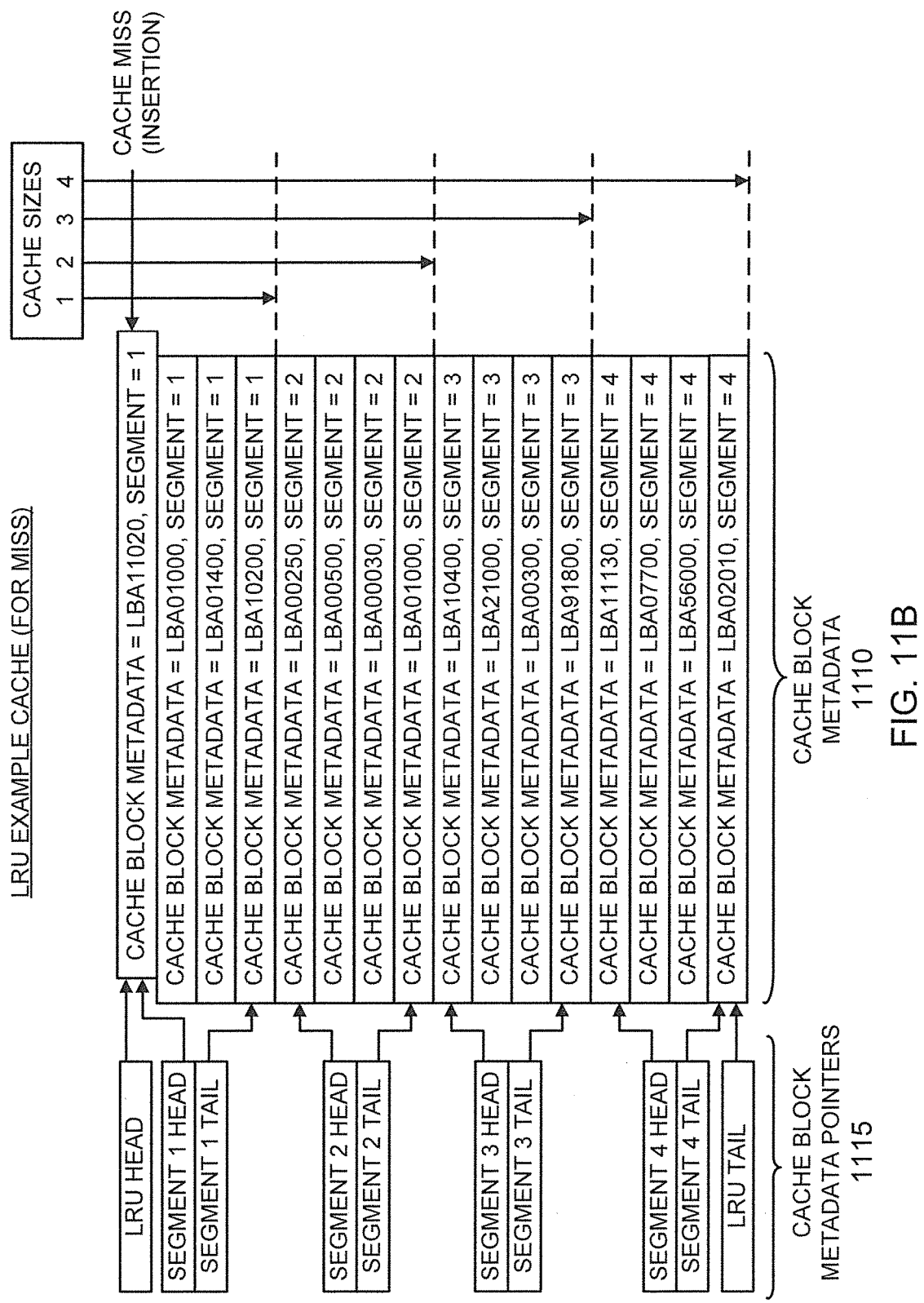

Referring next to FIGS. 11A and 11B which illustrate example operations of a LRU-based cache tracking mechanism with segment tracking pointers and segment identifiers added to cache block metadata prior to and subsequent to a cache miss. In this example, a cache read is received and an associated read location or LEA associated with the read request from which to read requested data is determined. The storage controller then traverses a linked list starting from the LRU head pointer to determine that the cache read is a miss on the simulated cache system. In some embodiments, the storage controller then traverses a linked list starting from the LRU head pointer to determine that the cache read is a hit on the simulated cache system. While traversing the LRU linked list, it is possible to find the cache block metadata. However, this technique can be slow due to the potentially very large number of metadata elements. In some embodiments, the look-up of the cache block metadata is done through the use of a hash table and a different linked list that that links cache block metadata together. Accordingly, in some embodiments, there can be two linked list elements in each cache block metadata, one linked list element for the LRU linked list and another linked list element for the hash table linked lists.

As illustrated in FIG. 11A, a cache miss is detected for ""LBA11020" and the storage controller responsively removes the oldest metadata block LBA38400. Subsequently, as illustrated in FIG. 11B, the metadata block is changed from "LBA38400" to "LBA11020" and is inserted at the head of the cache block metadata 1110 and the cache block metadata pointers 1115 and segment identifiers are adjusted accordingly. In this example, the LRU head pointer and the segment 1 head pointer are moved from the "LBA01000" metadata block to the "LBA11020" metadata block and the segment identifier for the "LBA11020" metadata block is modified from segment 4 to segment 1; the segment 1 tail pointer is moved from the "LBA00250" metadata block to the "LBA10200" metadata block; the segment 2 head pointer is moved from the "LBA00500" metadata block to the "LBA00250" metadata block and the segment identifier for the "LBA00250" metadata block is modified from segment 1 to segment 2; the segment 2 tail pointer is moved from the "LBA10400" metadata block to the "LBA01000" metadata block; the segment 3 head pointer is moved from the "LBA21000" metadata block to the "LBA10400" metadata block and the segment identifier for the "LBA104000" metadata block is modified from segment 2 to segment 3; the segment 3 tail pointer is moved from the "LBA11130" metadata block to the "LBA91800" metadata block; the segment 4 head pointer is moved from the "LBA007700" metadata block to the "LBA11130" metadata block and the segment identifier for the "LBA11130" metadata block is modified from segment 3 to segment 4; and the segment 4 tail pointer and LRU tail pointer is moved from what was the "LBA38400" metadata block to the "LBA02010" metadata block.

Figure 12:
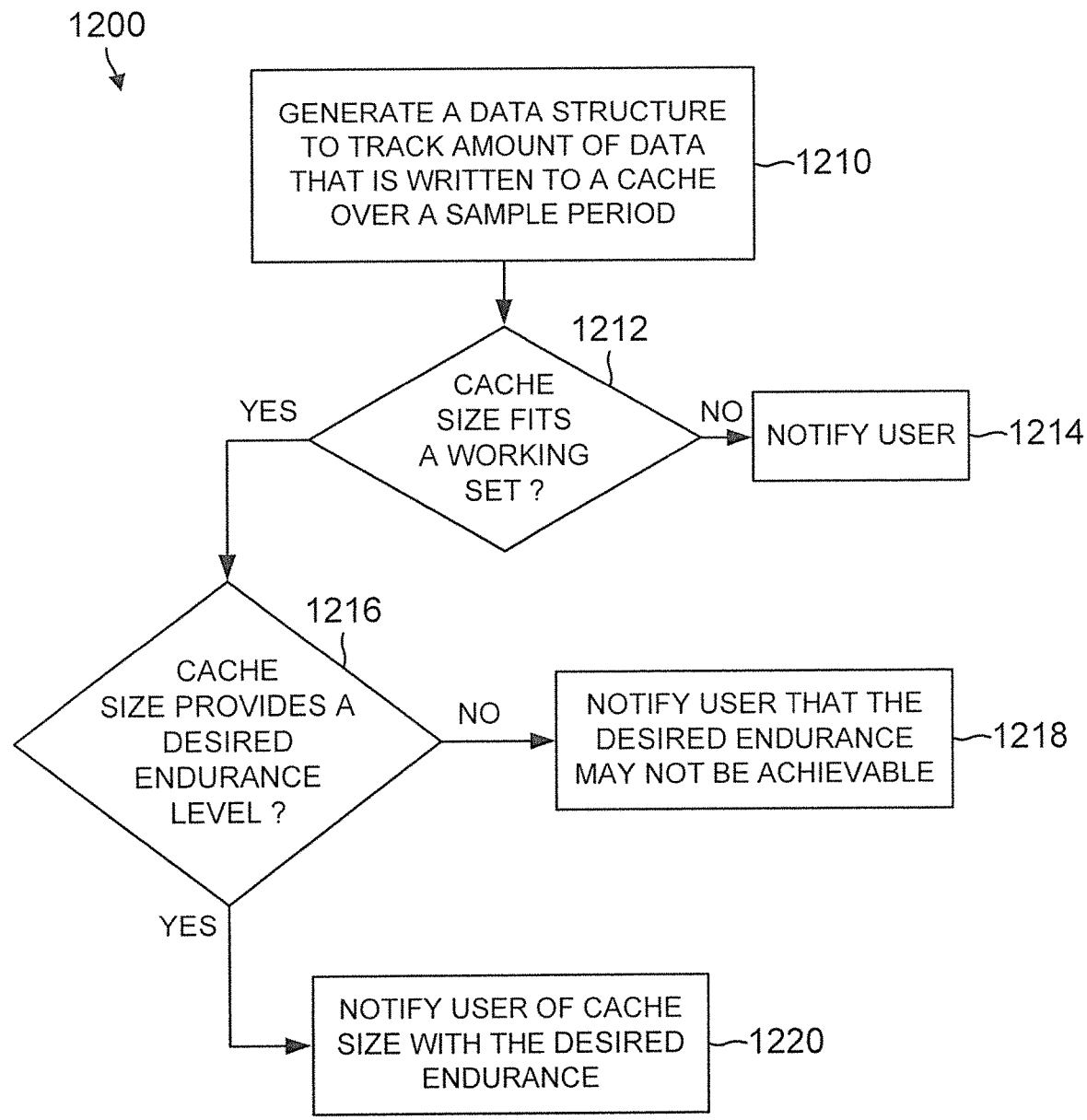
FIG. 12 shows a process for using the predictive cache statistics to predict a number and size of write operations for cache devices, according to one aspect of the present disclosure.

FIG. 12 is a flow diagram illustrating an example of a process 1200 for recommending cache sizes and/or device types that support a cache device's desired lifetime for a workload. SSDs using flash technology are faster than other storage device types. SSDs however come with certain limitations. For example, a SSD device can only support a certain number of write operations. The number of supported writes varies from device to device, for example, single level cell (SLC) based flash can typically support about 100,000 write cycles, enterprise multi-level NAND flash (eMLC) can support 30,000 writes, multi-level cell (MLC) can support 10,000 write cycles and commercial MLC (cMLC) may only support 1000 writes.

In one aspect, based on predicted usage for different cache sizes for different device types, an appropriate cache size can be selected for the lowest cost that meets a desired life cycle for the cache device. In another aspect, the different options for cache devices and cache device sizes can be presented to a user. In yet another aspect, based on the predicted usage, caching policies may be stored and optimized. Furthermore, a system that offers a combination of SSD storage devices and SSD cache, can adjust the percentage of cache used for caching to meet performance and endurance requirements.

Example process 1200 is discussed primarily with respect to a LRU-based cache tracking mechanism, however, as discussed above, other cache tracking mechanisms can also be utilized. A storage controller e.g., storage controller 200 of FIG. 2, among other functions, can perform the example process 1200. Specifically, an I/O tracking engine of a storage controller such as, for example, I/O tracking engine 224 of FIG. 2 can, among other functions, can perform process 1200. The I/O tracking engine may be embodied as hardware and/or software, including combinations and/or variations thereof. In addition, in some embodiments, the I/O tracking engine can include instructions, wherein the instructions, when executed by one or more processors of a storage controller, cause the storage controller to perform one or more steps including the steps described below. Process 1200 is described in conjunction with FIGS. 11A-11B which provides an example operation of a LRU-based cache tracking mechanism with segment tracking pointers and segment identifiers added to the cache block metadata.

Process 1200 starts in stage 1210, when a data structure to track an amount of data that is written to a cache over a sample period is generated. In one aspect, the segmented LRU process of FIGS. 11A-11B may be used to generate a table of bytes that are written to a cache over a sample period, for example, 60 minutes. The adaptive aspects disclosed herein are not limited to any specific sample period.

In stage 1212, the process determines if any particular cache size fits a workload size. If not, then in stage 1214, an administrator or client is notified electronically that the workload will not benefit from using a cache.

If the workload size fits one or more cache size, then the process using the data structure of stage 1210 determines if any particular cache size will provide a desired endurance level. The concept of desired endurance level is described below in detail with respect to FIG. 13.

If the desired endurance level cannot be achieved, then the user is electronically notified in stage 1218. If the desired endurance level can be achieved, then the user is notified in block 1220.

FIG. 13 shows a first data structure 1300 that includes columns 1302, 1304 and 1306. Column 1302 identifies different cache devices A, B and C. Each cache device has a desired endurance life that is listed in column 1306. Based on the desired life, the number of write operations for each cache device is listed in column 1304. For example, Device A may have 10 writes per day to provide a 5 year life cycle. Device B may have 3 writes per day to provide a desired life cycle of 3 years and Device C may have 1 write per day for a desired life cycle of 3 years.

Data structure 1300 shows an example of the desired life cycle and the supported number of write operations. The adaptive aspects described herein are not limited to any particular size or desired life.

FIG. 13 shows another data structure 1308 that is populated in stage 1210 of FIG. 12. Data structure 1308 is generated for a sample period, for example, an hour. Data structure 1308 includes a plurality of fields/columns 1310, 1312, 1314 and 1316 that are now described in detail.

Column 1310 shows the different cache sizes. Column 1312 shows the amount of data that is written within the sample duration. Cache size 1, 2 and 3 are not written and therefore do not have any corresponding entries. Column 1314 extrapolates the amount of data that will be written in a day for each device and a corresponding cache size for each device. Column 1316 shows the cache size in GB (gigabytes) to accommodate the write cycles for the desired years of life. The minimum cache size is obtained by dividing the amount of data written in a day by the number of writes that are allowed per day.

FIG. 13 also shows a data structure 1318 that may be used by block 1212 to determine if a cache size meets a workload size. Structure 1318 includes column 1320 that lists the cache size and column 1322 indicates if the workload size fits the cache size.

Figure 14:
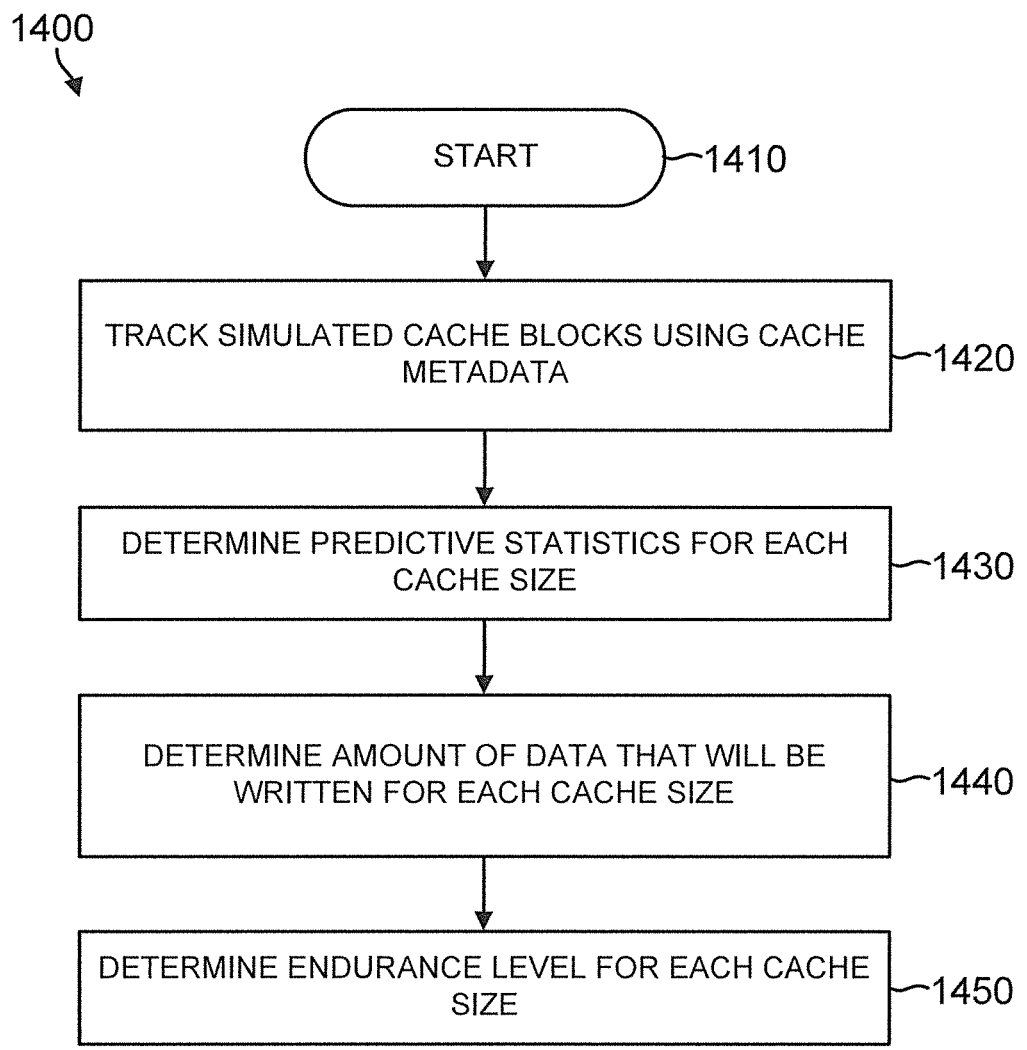
FIG. 14 shows a process for using predictive statistics, according to one aspect of the present disclosure.

FIG. 14 shows a process 1400, according to one aspect. A storage controller e.g., storage controller 200 of FIG. 2, among other functions, can perform the example process 1400. Specifically, an I/O tracking engine of a storage controller such as, for example, I/O tracking engine 224 of FIG. 2 can, among other functions, can perform process 1400. The I/O tracking engine may be embodied as hardware and/or software, including combinations and/or variations thereof. In addition, in some embodiments, the I/O tracking engine can include instructions, wherein the instructions, when executed by one or more processors of a storage controller, cause the storage controller to perform one or more steps including the steps described below.

Process 1400 begins in block 1410. In block 1420, simulated cache blocks of a cache system are tracked using cache metadata while performing a workload having a plurality of storage operations. The cache metadata is segmented as described above and each segment corresponds to a cache size. In block 1430, predictive statistics for each cache size is determined using a corresponding segment of the cache metadata. In block 1440, using the predictive statistics, the process determines an amount of data that is written for each cache size within certain duration. In block 1450, the process determines an endurance level for each cache size, after executing a certain number of write operations.

In one aspect, the methods and systems described above have various advantages. For example, predicted statistics are used to develop a prediction for a number and size of writes at an underlying cache device. This allows one to select an optimal cache device for a lowest cost that meets device endurance expectations. The different cache device and cache sizes can be presented to a user. Caching policies can be optimized to meet cache device life cycle. Cache writing can also be optimized to meet performance and endurance requirements.

The processes described herein are organized as sequences of operations in the flowcharts. However, it should be understood that at least some of the operations associated with these processes potentially can be reordered, supplemented, or substituted for, while still performing the same overall technique.

The technology introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the technology introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc. The term "logic", as used herein, can include, for example, special-purpose hardwired circuitry, software and/or firmware in conjunction with programmable circuitry, or a combination thereof.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method comprising:
tracking a first amount of data written to simulated cache blocks of a cache system using cache metadata while performing a workload having a plurality of storage operations during a sample period, wherein the cache metadata is segmented, each segment corresponding to a different one of a plurality of cache sizes for each of a plurality of cache devices;
extrapolating, from the first amount of data tracked for each segment of the cache metadata, a respective second amount of data to be written for each segment within a duration;
determining a number of write operations supported by each of the plurality of cache devices for the duration in which the second amount of data is to be written;
determining a minimum cache size for each of the plurality of cache devices to write the respective second amount of data for each segment, based on the number of write operations supported by that cache device and a desired life cycle for that cache device; and
selecting at least one of the plurality of cache devices for performing storage operations within the cache system, based at least in part on the minimum cache size determined for each cache device.

2. The method of claim 1, wherein the cache metadata uses a segment identifier for tracking each segment of the cache metadata.

3. The method of claim 1, wherein a storage controller tracks the simulated cache blocks of the cache system using the cache metadata.

4. The method of claim 3, wherein the simulated cache blocks of the cache system are tracked using a least recently used cache tracking mechanism.

5. The method of claim 3, wherein the simulated cache blocks of the cache system are tracked using a most recently used cache tracking mechanism.

6. The method of claim 1, further comprising: notifying a user as to whether or not the desired life cycle for each of the plurality of cache devices is achievable based on the number of write operations supported by each cache device.

7. The method of claim 1, wherein the cache system includes a solid state cache system that operates as a secondary cache system.

8. A non-transitory machine readable medium having stored thereon instructions for performing a method comprising machine executable code which when executed by at least one machine, causes the machine to:
track a first amount of data written to simulated cache blocks of a cache system using cache metadata while performing a workload having a plurality of storage operations during a sample period, wherein the cache metadata is segmented, each segment corresponding to a different one of a plurality of cache sizes for each of a plurality of cache devices;
extrapolate, from the first amount of data tracked for each segment of the cache metadata, a respective second amount of data to be written for each segment within a duration;
determine a number of write operations supported by each of the plurality of cache devices for the duration in which the second amount of data is to be written;
determining a minimum cache size for each of the plurality of cache devices to write the respective second amount of data for each segment, based on the number of write operations supported by that cache device and a desired life cycle for that cache device; and
select at least one of the plurality of cache devices for performing storage operations within the cache system, based at least in part on the minimum cache size determined for each cache device.

9. The storage medium of claim 8, wherein the cache metadata uses a segment identifier for tracking each segment of the cache metadata.

10. The storage medium of claim 8, wherein a storage controller tracks the simulated cache blocks of the cache system using the cache metadata.

11. The storage medium of claim 10, wherein the simulated cache blocks of the cache system are tracked using a least recently used cache tracking mechanism.

12. The storage medium of claim 10, wherein the simulated cache blocks of the cache system are tracked using a most recently used cache tracking mechanism.

13. The storage medium of claim 8, the machine executable code further causing the machine to notify a user as to whether or not the desired life cycle for each of the plurality of cache devices is achievable based on the number of write operations supported by each cache device.

14. The storage medium of claim 8, wherein the cache system includes a solid state cache system that operates as a secondary cache system.

15. A computing device comprising:
a memory containing machine readable medium comprising machine executable code having stored thereon instructions for performing a method of simulating a cache system;
a processor coupled to the memory, the processor configured to execute the machine executable code to cause the processor to:
track a first amount of data written to simulated cache blocks of the cache system using cache metadata while performing a workload having a plurality of storage operations during a sample period, wherein the cache metadata is segmented, each segment corresponding to a different one of a plurality of cache sizes for each of a plurality of cache devices;
extrapolate, from the first amount of data tracked for each segment of the cache metadata, a respective second amount of data to be written for each segment within a duration; and
determine a number of write operations supported by each of the plurality of cache devices for the duration in which the second amount of data is to be written;
determining a minimum cache size for each of the plurality of cache devices to write the respective second amount of data for each segment, based on the number of write operations supported by that cache device and a desired life cycle for that cache device; and
select at least one of the plurality of cache devices for performing storage operations within the cache system, based at least in part on the minimum cache size determined for each cache device.

16. The system of claim 15, wherein the cache metadata uses a segment identifier for tracking each segment of the cache metadata.

17. The system of claim 15, wherein the simulated blocks of the cache system are tracked using cache metadata.

18. The system of claim 17, wherein the simulated cache blocks of the cache system are tracked using a most recently used cache tracking mechanism.

19. The system of claim 15, wherein a user is notified as to whether or not the desired life cycle for each of the plurality of cache devices is achievable based on the number of write operations supported by each cache device.

20. The system of claim 15, wherein the cache system includes a solid state cache system that operates as a secondary cache system.

* * * * *